(12) United States Patent
Miyashita et al.

(10) Patent No.: US 7,778,809 B2
(45) Date of Patent: Aug. 17, 2010

(54) TIRE CHARACTERISTIC CALCULATION METHOD, TIRE DYNAMIC ELEMENT PARAMETER VALUE DERIVATION METHOD, VEHICLE TRAVELING SIMULATION METHOD, AND TIRE DESIGNING METHOD AND VEHICLE DESIGNING METHOD IN WHICH CONSIDERATION IS GIVEN TO TIRE FRICTION ELLIPSE

(75) Inventors: Naoshi Miyashita, Kanagawa (JP); Kazuyuki Kabe, Kanagawa (JP); Masahiko Mizuno, Aichi (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 412 days.

(21) Appl. No.: 11/842,883

(22) Filed: Aug. 21, 2007

(65) Prior Publication Data
US 2008/0059134 A1    Mar. 6, 2008

(30) Foreign Application Priority Data

Aug. 22, 2006   (JP) ............................ 2006-225069
Aug. 22, 2006   (JP) ............................ 2006-225070

(51) Int. Cl.
*G06F 17/10* (2006.01)
*G06G 7/48* (2006.01)
(52) U.S. Cl. ................................. 703/2; 703/6; 703/8
(58) Field of Classification Search .................. 703/2, 703/6, 8; 73/146; 152/209.8, 209.14, 209.23
See application file for complete search history.

(56) References Cited

U.S. PATENT DOCUMENTS

| 5,880,362 A | 3/1999 | Tang et al. |
| 5,944,082 A * | 8/1999 | Thompson et al. ........ 152/209.8 |
| 6,754,615 B1 | 6/2004 | Germann et al. |

(Continued)

FOREIGN PATENT DOCUMENTS

EP    1 297 975    4/2003

(Continued)

OTHER PUBLICATIONS

Pacejka, H. Non-Steady-State Out-of-Plane String-Based Tyre Models, Sciencedirect, Tyre and Vehicle Dynamics, 2006, pp. 216-294.*

(Continued)

*Primary Examiner*—Russell Frejd
(74) *Attorney, Agent, or Firm*—Knobbe Martens Olson & Bear, LLP

(57) ABSTRACT

Values of multiple tire dynamic element parameters are set for a tire dynamic model constructed using the tire dynamic element parameters for calculating a tire axial force and a self-aligning torque under a given slip ratio. Next, the values of the tire axial force and the self-aligning torque are calculated using the tire dynamic model and output. The tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force. When designing a vehicle or when designing a tire, the tire dynamic model is used.

18 Claims, 21 Drawing Sheets

U.S. PATENT DOCUMENTS

| | | | |
|---|---|---|---|
| 7,363,805 B2* | 4/2008 | Jayakumar et al. | 73/146 |
| 7,483,821 B2* | 1/2009 | Miyashita et al. | 703/8 |
| 7,680,610 B2* | 3/2010 | Miyashita et al. | 702/34 |
| 2007/0233352 A1* | 10/2007 | Miyashita et al. | 701/82 |

FOREIGN PATENT DOCUMENTS

| | | |
|---|---|---|
| EP | 1 516 751 | 3/2005 |
| JP | 2002-356106 | 12/2002 |
| JP | 2003-57134 | 2/2003 |
| JP | 2006-225069 | 8/2006 |
| JP | 2006-225070 | 8/2006 |

OTHER PUBLICATIONS

Miyashita, N. et al., "A new analytical tire model for cornering simulation. Part II: cornering force and self-aligning torque", Tire Science and Technology, XX, XX, vol. 34, No. 2, Jun. 2006, pp. 100-118, XP009092085.

Lacombe, J. Ed —Joines, J. A. et al., "Tire model for simulations of vehicle motion on high and low friction road surfaces", Simulation Conference, 2000. Proceedings. Winter Orlando, FL, USA Dec. 10-13, 2000, Piscataway, NJ, USA, IEEE, US, vol. 1, pp. 1025-1034, XP010529378, ISBN: 0-7803-6579-8.

Gafvert M. et al., "A novel semi-empirical tyre model for combined slips", Vehicle System Dynamics Swets & Zeitlinger Netherlands, vol. 43, No. 5, May 2005, pp. 351-384, XP002459819, ISSN: 0042-3114.

Kabe, K. et al., "A new analytical tire model for cornering simulation. Part I: cornering power and self-aligning torque power", Tire Science and Technology, XX, XX, vol. 34, No. 2, Jun. 2006, pp. 84-99, XP009092086.

Partial European Search Report from EP 07 11 4754, dated Nov. 30, 2007.

Hans. B. Pacejka, "Tire and Vehicle Dynamics", pp. 172-191, ISBN: 0-7506-5141-5, Butterworth-Heinemann (Sep. 2002).

Lugner, et al.., "Rcent advances in tyre models and testing procedures". Vehicle System Dynamics, Jun./Jul. 2005, Taylor and Francis Ltd. GB, vol. 43, No. 6-7, Jun. 2005, pp. 413-436.

International Search Report for European Application No. EP 07 11 4754 dated Jan. 26, 2010.

* cited by examiner

CHANGE BY ORDER n OF $D_{gsp}(t; n, q)$ $$p(t) = \frac{n+1}{n} \cdot \frac{F_z}{wl} \cdot D_{gsp}(t;n,q)$$

$$D_{gsp}(t;n,q) = (1-|2t-1|^n) \cdot \{1-q \cdot (2t-1)\}$$

CHANGE BY BIAS COEFFICIENT q OF $D_{gsp}(t; n, q)$

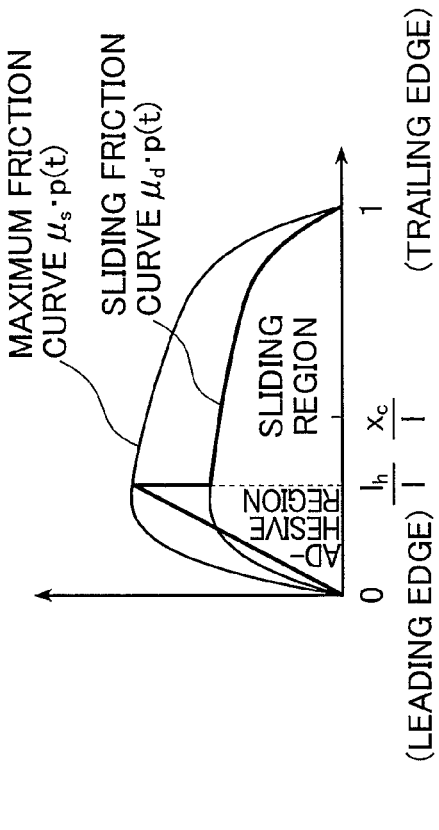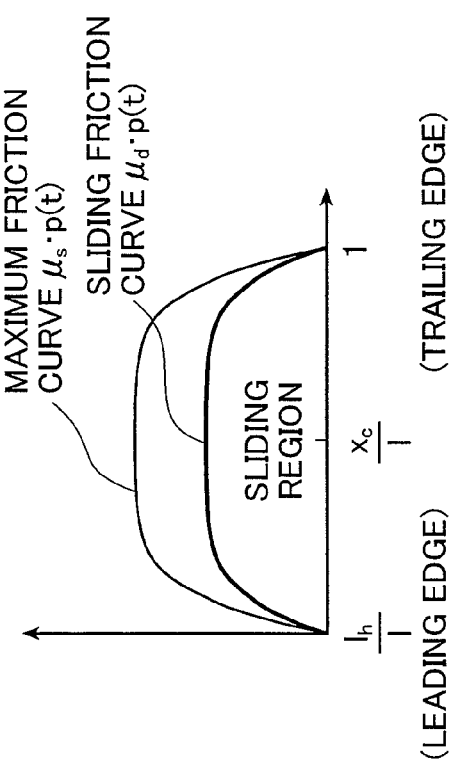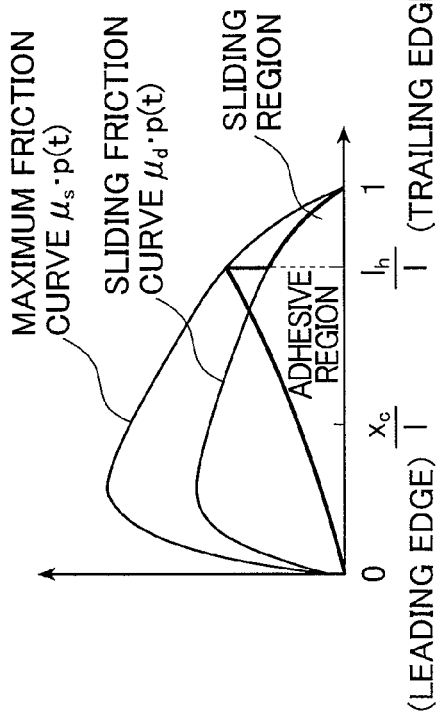

FIG. 15
TIRE A: (DRIVING) ——S=0.10  — — S=0.05  - - - S=0.02
(BRAKING) - - - S=-0.02  — — S=-0.05  ——S=-0.10
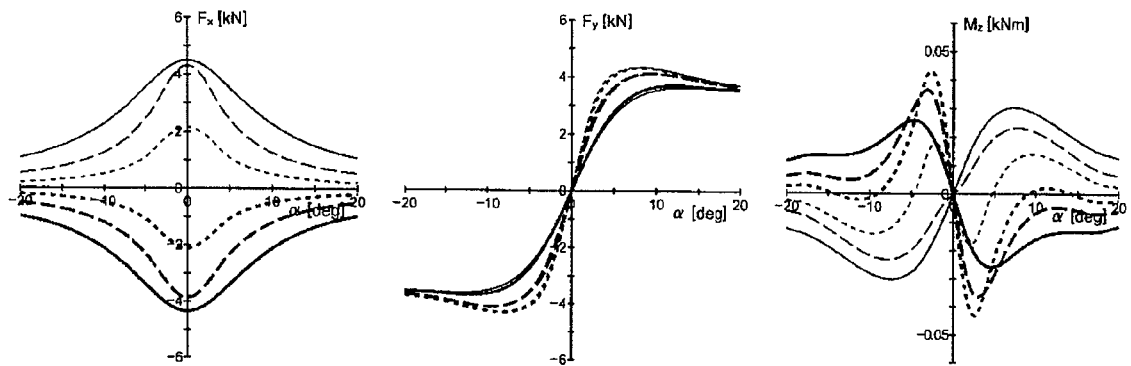
TIRE B: (DRIVING) ——S=0.10  — — S=0.05  - - - S=0.02
(BRAKING) - - - S=-0.02  — — S=-0.05  ——S=-0.10
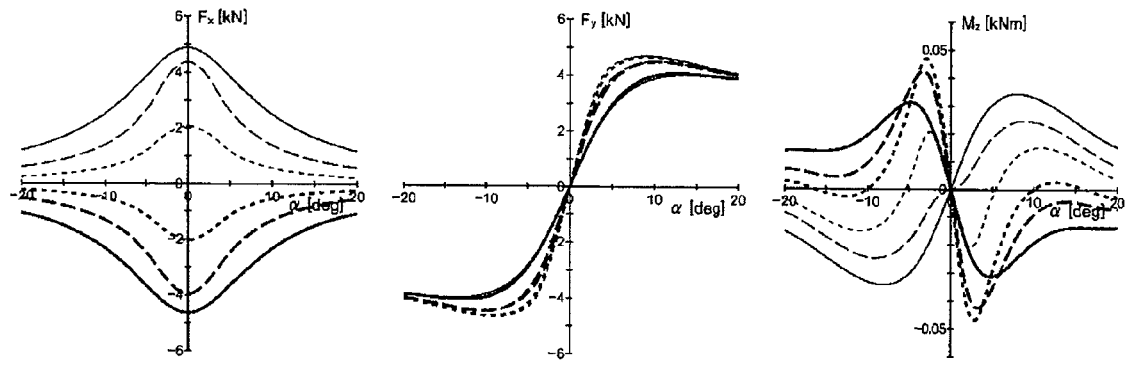

FIG.16
TIRE A: —— α=-4deg  — — α=-2deg  - - - α=-1deg
- - - α=1deg  — — α=2deg  —— α=-4deg
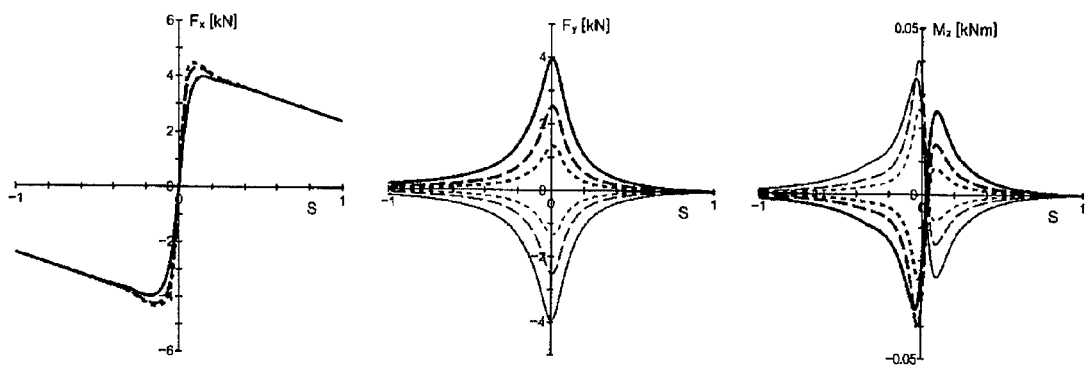
TIRE B: —— α=-4deg  — — α=-2deg  - - - α=-1deg
- - - α=1deg  — — α=2deg  —— α=-4deg
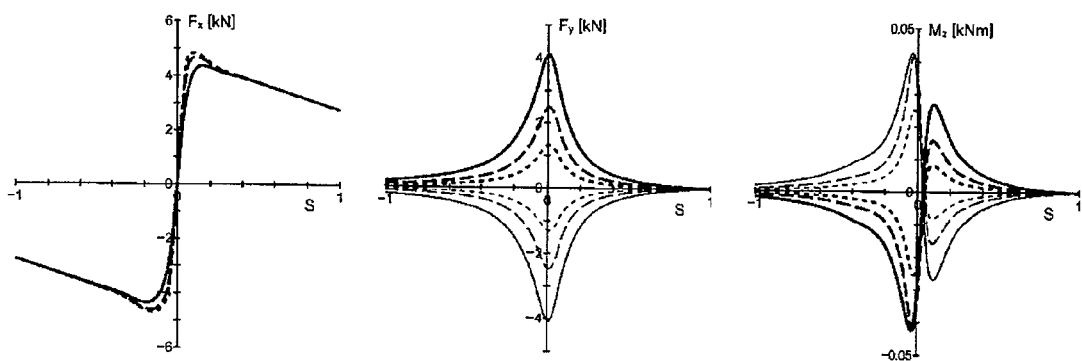

FIG.21A
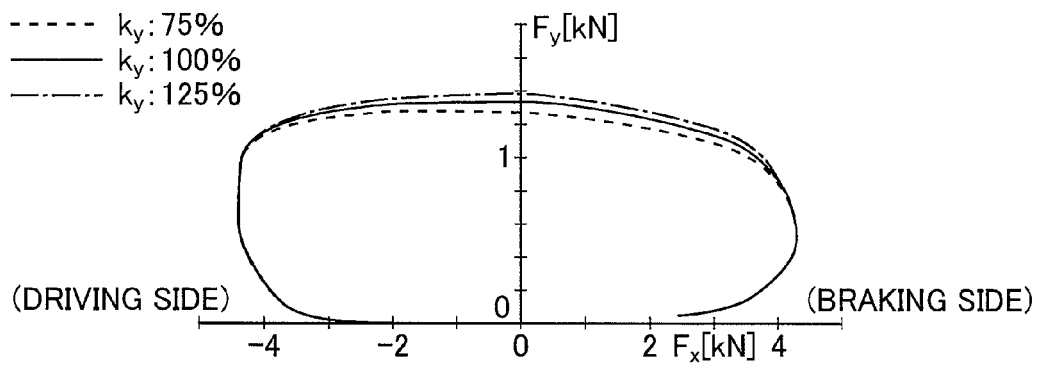
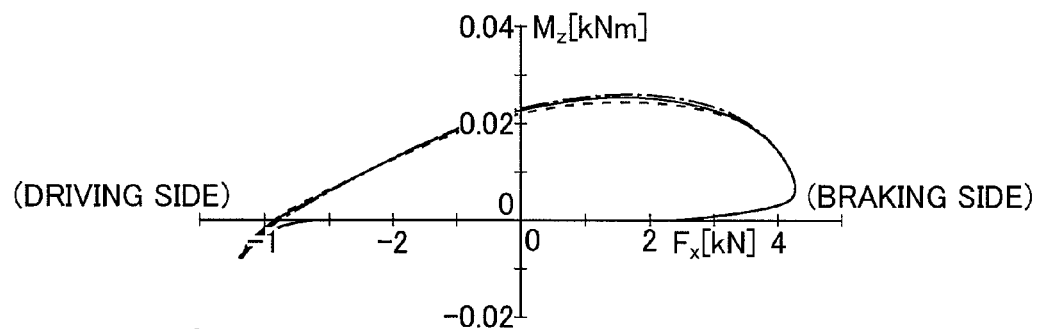
FIG.21B
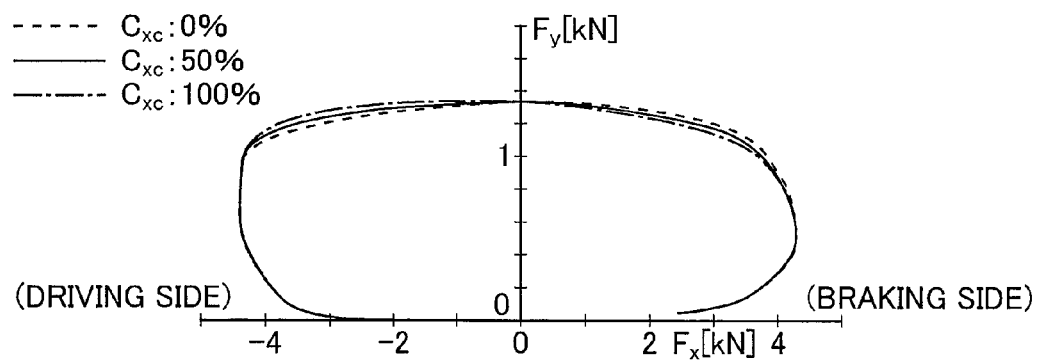
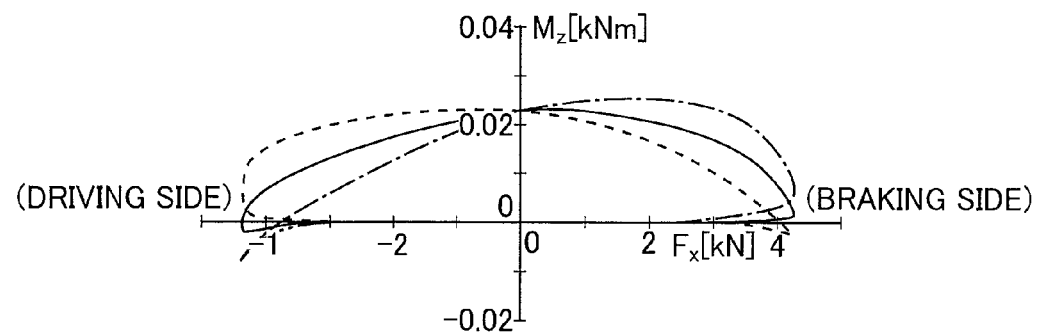

TIRE CHARACTERISTIC CALCULATION METHOD, TIRE DYNAMIC ELEMENT PARAMETER VALUE DERIVATION METHOD, VEHICLE TRAVELING SIMULATION METHOD, AND TIRE DESIGNING METHOD AND VEHICLE DESIGNING METHOD IN WHICH CONSIDERATION IS GIVEN TO TIRE FRICTION ELLIPSE

CROSS-REFERENCE TO RELATED APPLICATIONS

This application claims the benefit and priority to Japanese Application Number 2006-225070 filed on Aug. 22, 2006 and Japanese Application Number 2006-225069 filed on Aug. 22, 2006. The disclosures of the above-described applications are hereby incorporated by reference in their entirety.

BACKGROUND OF THE INVENTION

The present invention relates to a method of calculating a value of at least one of a tire axial force and self-aligning at the time when a slip ratio is given to a tire, a method of deriving a value of a tire dynamic element parameter used in a tire dynamic model from a characteristic curve expressing dependency of at least one of the tire axial force and a self-aligning torque on the slip ratio, a vehicle traveling simulation method of performing a simulation of traveling of a vehicle fitted with the tire using the characteristic curve expressing the slip ratio dependency, and a method of designing the vehicle or the tire by performing the vehicle traveling simulation using information of the characteristic curve expressing the slip ratio dependency and information of a vehicle specification.

Nowadays, a vehicle specification that realizes desired vehicle performance is determined in an initial stage of vehicle development by performing a computer-based simulation and judging whether the desired vehicle performance is achieved. In other words, a vehicle model is created based on data of a set vehicle specification, a vehicle traveling simulation is performed by giving a tire generation force to this vehicle model, and performance of a vehicle under this vehicle specification is evaluated based on a result of the simulation.

In particular, when a vehicle traveling simulation is performed, tires are sole construction components that transfer a force received from a road surface to a vehicle and are components that give a significant influence on performance of the vehicle. Therefore, there is a necessity to determine a tire generation force accurately. The generation force described in this specification refers to a longitudinal force and a lateral force during cornering. A technique is proposed with which a characteristic curve expressing dependency of a lateral force of a tire, which occurs during cornering as the tire generation force, and a self-aligning torque on a slip angle, a characteristic curve of a longitudinal force that occurs during braking/driving, and characteristic curves of the longitudinal force, the lateral force, and the self-aligning torque that occur during the braking/driving and the cornering are approximated with "Magic Formula" represented in a standard form by formula (20) given below.

$$Y(x) = D \sin[C \tan^{-1}\{Bx - E(Bx - \tan^{-1}(Bx))\}] \quad (20)$$

Here, "Magic Formula" is a non-analytic model using a nonlinear approximation expressing a tire characteristic by determining values of respective parameters B to E in formula (20). In this model, as to a lateral force $F_y$ in the case where a composite characteristic such as "a change of dependency of a lateral force on a slip angle according to a slip ratio S" is expressed, a lateral force $F_{y0}$ under a condition, in which no slip ratio S is applied as in the formula (20), is amended as expressed by formula (21) given below. A longitudinal force and a self-aligning torque are also amended in the same manner as in the case of the lateral force.

$$F_y = G_{yk} \cdot F_{y0} + S_{vyk} \quad (21)$$

($G_{yk}$ is a coefficient associated with the slip ratio S and $S_{vyk}$ is a coefficient associated with the slip ratio S)

Generally, a vehicle traveling simulation is performed using values of the parameters B to E, $G_{yk}$, $S_{vyk}$, and the like of this "Magic Formula" (hereinafter referred to as the "Magic Formula" parameter).

A conventional vehicle designing method using such a vehicle performance evaluation will be described.

First, in an initial stage of vehicle development, a vehicle model is created by setting a desired vehicle specification (such as a desired wheel base, height of a gravitational center, and weight distribution between vehicle front and rear wheels) and values of the "Magic Formula" parameters of a tire are set and given to the vehicle model. Next, a traveling condition for a vehicle traveling simulation is set and the vehicle traveling simulation is performed in accordance with this traveling condition. The traveling condition is changed in accordance with performance to be evaluated and when the performance evaluation is a durability evaluation, for instance, a vehicle traveling speed and profile data of roughness or the like of a road surface are set as the traveling condition. In the case of an emergency avoidance performance evaluation, a vehicle traveling speed, a steering angle, and braking/driving data according to a slip ratio including a slip ratio in a braking/driving direction, profile data of an actual road surface, or the like is set as the traveling condition.

Meanwhile, as examples of the vehicle model, it is possible to cite an analysis model for mechanism used by an analysis software for mechanism, such as "ADAMS" (manufactured by MDI Corporation in USA), and an analysis model used in vehicle movement analysis software combined with dedicated software for control and design such as "CarSim" (manufactured by Mechanical Simulation Corporation) or "MatLab" (manufactured by The MathWorks, Inc.).

Next, performance evaluation data that is a performance indicator is extracted based on a result of the traveling simulation. In the case of the durability performance, for instance, the maximum value of a stress placed on a specific member or a deformation amount of the specific member is used as the performance evaluation data. In the case of the emergency avoidance performance, stability based on a relation between the vehicle traveling speed and the maximum lateral acceleration or a vehicle slip angle and stability of the vehicle slip angle's changing rate due to the vehicle's tracing is evaluated. When the performance evaluation data does not reach a target value determined at a vehicle planning stage, a part of the vehicle specification is amended. For instance, the weight distribution between the vehicle front and rear wheels is amended, a characteristic of a construction component such as suspension is amended, or a tire generation force, such as a characteristic curve of a tire longitudinal force or a characteristic curve of a tire lateral force, is amended. When the tire generation force is amended, values of the "Magic Formula" parameters described above are amended.

Then, the amendment described above is repeated until the performance evaluation data reaches the target value. When the target value is reached, the vehicle specification, the construction component characteristic, or the values of the "Magic Formula" parameters expressing the tire characteristic at that time are determined as a requisite characteristic.

A car manufacturer proceeds to detailed designing of construction components in accordance with this determination. For tires that cannot be designed by the car manufacturer, the car manufacturer presents the determined tire requisite characteristic, in other words, the determined values of the "Magic Formula" parameters as requisite items to a tire manufacturer and orders tire delivery.

In response to this order, the tire manufacturer performs tire structure designing and tire material designing, in which the values of the "Magic Formula" parameters described above are realized, and repeats manufacturing a prototype of the tire so that the presented requisite items are satisfied.

With the method described above, however, the "Magic Formula" parameters used as the tire requisite characteristic are parameters of a model specialized on a description of a cornering characteristic in which no consideration is given to actual tire dynamical behavior. Therefore, the "Magic Formula" parameters expressed by formula (20) given above do not reflect a structural mechanism giving an influence on a tire cornering characteristic. This leads to a problem that even when the values of the "Magic Formula" parameters are given as the requisite items, the values are not linked with tire dynamic element parameters expressing various kinds of tire stiffness giving an influence on the tire cornering characteristic and are not directly reflected in the tire structure designing and material designing. Also, the "Magic Formula" parameters given as the requisite items are parameters determined without giving consideration to the tire structural dynamic mechanism, so there are many cases where it is impossible to say that the parameters are realizable with an actual tire.

Meanwhile, JP 2002-356106 A discloses a tire designing method with which it is possible to perform optimal designing by evaluating performance of a tire through combination with a vehicle fitted with the tire.

In brief, in JP 2002-356106 A, the tire is modeled with finite elements based on a design value, a tire traveling simulation is performed, tire characteristic data is acquired through this simulation, and a vehicle traveling simulation is performed using this tire characteristic data. With this method, the tire is finely modeled with the finite elements, so there are an extremely large number of parts that are amendment targets, which results in occurrence of many cases, in which it is unclear which part should be amended, and which results in a necessity to rely on a skilled designer. Also, there is a necessity to repeat the tire traveling simulation and the vehicle traveling simulation many times, which makes it difficult to efficiently find a design value that realizes satisfactory performance.

In addition, with "Magic Formula", as described in "TIRE AND VEHICLE DYNAMICS" (HANS. B. PACEJKA, ISBH 0-7506-5141-5), pp. 172-191, it is possible to amend a lateral force and a longitudinal force which occur to a tire, in other words, it is possible to amend a tire characteristic by changing a scale factor $\lambda$. In other words, it is possible to amend the lateral force and the longitudinal force which occur to the tire independently of each other. For instance, in a development initial stage, it is possible to make a setting so that the tire longitudinal force is increased to thereby significantly enhance stop distance performance, make a setting so that the lateral force is decreased to thereby prevent a turnover at the time of emergency obstacle avoidance, and determine them as a tire requisite characteristic.

The lateral force and the longitudinal force that occur to the tire, however, are not forces that occur due to independent mechanisms from the viewpoint of structural mechanics but are closely related forces, so there are also many cases where the tire demand characteristic described above is unrealizable with an actual tire.

When the contents of JP 2002-356106 A are described in a more concrete manner, first, modeling is performed with tire finite elements based on input of a tire design value and a tire traveling simulation is performed. Tire characteristic data is calculated through this traveling simulation and the "Magic Formula" parameters are obtained from this tire characteristic data.

On the other hand, a vehicle model that is a mechanism analytic model is created based on a setting of data of a vehicle specification. Next, a traveling simulation condition is set and given to the vehicle model together with the "Magic Formula" parameters obtained in advance, and a vehicle traveling simulation is performed. Performance evaluation data is calculated from a result of the traveling simulation.

Generally, for instance, in the case of durability performance, the maximum value of a stress placed on a specific member or a deformation amount of the specific member is used as the performance evaluation data. In the case of emergency avoidance performance, stability based on a relation between a vehicle traveling speed and the maximum lateral acceleration or a vehicle slip angle and stability of the vehicle slip angle's changing rate due to the vehicle's tracing is evaluated.

When this performance evaluation data does not reach a target value, it is judged that the target is not achieved and the tire design value is amended. In accordance with this amendment, the tire model constructed with the finite element is created again.

Then, the tire design value is repeatedly amended until the performance evaluation data obtained as a result of the vehicle traveling simulation reaches the target value. When the performance evaluation data reaches the target value, the amended tire design value is determined as a tire design specification.

With the designing method described above, however, when it is impossible to achieve the predetermined target performance in the performance evaluation, the tire design value (such as a tire shape or a size of each tire part) is amended, so it is difficult to find how the "Magic Formula" parameters exerting a direct influence on the vehicle traveling simulation is to be amended through a result of the amendment of the tire design value and it is impossible to sufficiently grasp whether the target performance is approached through the amendment of the tire design values. Therefore, in order to efficiently determine the tire design specification by amending the tire design values, the work needs to be done by a skilled designer, meaning that it is impossible for everybody to determine the design specification with ease. In other words, the tire is finely modeled with the finite elements, so there are an extremely large number of parts that are amendment targets, which results in occurrence of many cases where it is unclear which part should be amended and makes it unavoidable to rely on a skilled designer. Also, there is complexity in which each time tire design values are amended, the tire model that is a finite element model needs to be created again. Further, it is required to repeat the time-consuming tire traveling simulation and vehicle traveling simulation many times, which makes it difficult to efficiently find tire design values that realize satisfactory performance. In particular, in a vehicle traveling simulation in which a slip angle and a slip ratio in a braking/driving direction are given to a tire, it is difficult to find such a tire design value with efficiency.

SUMMARY OF THE INVENTION

Therefore, the present invention has an object to provide methods of solving the problems of the designing methods described above and efficiently performing a tire or vehicle designing method. More specifically, the present invention has an object to provide a method, with which a value of at least one of a tire axial force and self-aligning torque at the time when a slip ratio is given to a tire is calculated, and a method with which values of tire dynamic element parameters used in a tire dynamic model are derived from a characteristic curve expressing the slip ratio dependency of at least one of the tire axial force and the self-aligning torque. In addition, the present invention has an object to provide a vehicle traveling simulation method with which a traveling simulation of a vehicle fitted with the tire is performed using the characteristic curve expressing the slip ratio dependency.

Also, the present invention has an object to provide a vehicle designing method with a concept of a tire frictional ellipse employed, with which as is different from a conventional vehicle designing method, approximate expression parameters for an approximate expression like "Magic Formula" expressed as a tire cornering characteristic and a braking/driving characteristic at the time when a slip ratio is given to a tire are linked with tire dynamic element parameters including various kinds of tire stiffness, determined values of the approximate expression parameters for "Magic Formula" or the like are realizable, and it is possible to present realizable tire requisite characteristic with efficiency.

Further, the present invention has an object to provide a tire designing method, with which approximate expression parameters for an approximate expression like "Magic Formula" expressed as a tire cornering characteristic and a braking/driving characteristic at the time when a slip ratio is given to a tire are linked with tire dynamic element parameters including various kinds of tire stiffness, determined values of the approximate expression parameters for "Magic Formula" or the like are realizable, and it is possible not only for a skilled designer but also for an unskilled designer to efficiently determine a tire design specification that achieves target performance.

The present invention provides a tire characteristic calculation method of calculating at least one of a value of a tire axial force and a value of a self-aligning torque, each of the tire axial force and the self-aligning torque acting on a tire rotation axis at a time when a slip ratio is given to a tire. The method comprises the steps of:

setting values of a plurality of tire dynamic element parameters for a tire dynamic model constructed by using the tire dynamic element parameters; and calculating at least one of the value of the tire axial force and the value of the self-aligning torque using the tire dynamic model to which the set values of the tire dynamic element parameters are given, and outputting the calculated value, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

The present invention also provides a tire dynamic element parameter value derivation method of deriving, from a characteristic curve expressing slip ratio dependency of at least one of a tire axial force and a self-aligning torque that act on a tire rotation axis at a time when a slip ratio is given to a tire, values of a plurality of tire dynamic element parameters for a tire dynamic model constructed by using the tire dynamic element parameters, the tire dynamic element parameters determining the characteristic curve. The method comprises the steps of:

acquiring the characteristic curve;

setting initial values of the tire dynamic element parameters for the tire dynamic model;

calculating a curve corresponding to the characteristic curve using the initial values and the tire dynamic model;

repeating, until the calculated curve matches with the characteristic curve within an allowance range, an amendment of the set values of the tire dynamic element parameters and a calculation of the curve corresponding to the characteristic curve each time the set values of the tire dynamic element parameters are amended; and determining the values of the tire dynamic element parameters at a time when the calculated curve matches with the characteristic curve within the allowance range as final values of the tire dynamic element parameters corresponding to the characteristic curve, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

The present invention still also provides a vehicle traveling simulation method of performing a traveling simulation of a vehicle fitted with a tire using a characteristic curve expressing slip ratio dependency of at least one of a tire axial force and a self-aligning torque that act on a tire rotation axis at a time when a slip ratio is given to the tire. The method comprises the steps of:

setting values of a plurality of tire dynamic element parameters for a tire dynamic model constructed by using the tire dynamic element parameters;

calculating the characteristic curve expressing the slip ratio dependency using the tire dynamic model to which the set values of the tire dynamic element parameters are given, and outputting the calculated characteristic curve; and providing, to a vehicle model, values of approximate expression parameters that stipulate a nonlinear approximation and are obtained at a time when the calculated characteristic curve is approximated with the nonlinear approximation performing the traveling simulation under a predetermined traveling condition by using the vehicle model, and outputting a result of the simulation, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

The present invention further provides a vehicle designing method, with a concept of a tire friction ellipse employed, of designing a vehicle having desired vehicle performance by performing a vehicle traveling simulation using information of a vehicle specification and information of a characteristic curve expressing slip ratio dependency of at least one of a tire axial force and a self-aligning torque that act on a tire rotation axis at a time when a slip ratio is given to a tire. The method comprises:

a model creating step of creating a vehicle model by using the information of the vehicle specification;

a performance evaluating step of: providing values of approximate expression parameters for stipulating a nonlinear approximation to the vehicle model, the values of the approximate expression parameters being obtained by approximating the characteristic curve with a nonlinear approximation, performing the traveling simulation under a traveling condition in which the slip ratio is given, and evaluating a vehicle performance by using a result of the traveling simulation;

a vehicle specification amending step of: amending the information of the vehicle specification when the vehicle model fails to satisfy target performance in the performance evaluating step, creating the vehicle model by using the amended information of the vehicle specification, performing the traveling simulation, and evaluating the vehicle performance;

a tire characteristic amending step of: amending the values of the approximate expression parameters when the vehicle model fails to satisfy predetermined target performance in the performance evaluating step, performing the traveling simulation by giving the amended values of the approximate expression parameters to the vehicle model, performing the vehicle performance evaluation by using a result of the traveling simulation, calculating the characteristic curve expressing the slip ratio dependency from a nonlinear approximation stipulated by the amended values of the approximate expression parameters, and deriving values of a plurality of tire dynamic element parameters through the calculated characteristic curve based on a tire dynamic model constructed by the tire dynamic element parameters; and a tire characteristic determining step of: determining, when the vehicle model satisfies the target performance, the values of the tire dynamic element parameters derived in correspondence with the amended values of the approximate expression parameters as a tire requisite characteristic, and outputting the determined tire requisite characteristic, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force, and the tire characteristic amending step is performed after the vehicle specification amending step is performed at least once.

In the above mentioned vehicle designing method, it is preferable that the tire dynamic model calculates a lateral force, at a time when a slip angle is given to the tire dynamic model as a part of the slip ratio, and calculates the self-aligning torque by separately calculating a lateral force based torque component generated by the lateral force that acts on the contact patch of the tire dynamic model and a longitudinal force based torque component generated by the longitudinal force that acts on the contact patch of the tire dynamic model.

Preferably, the tire axial force at least includes a lateral force that acts in a direction parallel to the tire rotation axis when a slip angle is given to the tire dynamic model as a part of the slip ratio; and the calculating of the characteristic curve in the tire characteristic amending step includes calculating a characteristic curve of the lateral force, and also a characteristic curve expressing slip ratio dependency of a self-aligning torque which is generated by the lateral force and the longitudinal force that act between the tire dynamic model and the road surface.

More preferably, the values of the tire dynamic element parameters are derived in the tire characteristic amending step so that a value of a combined sum of squared residuals obtained through weighted addition of a first sum of squared residuals, a second sum of squared residuals, and a third sum of squared residuals by using weighting coefficients becomes equal to or smaller than a predetermined value, the first sum of squared residuals representing a sum of squared residuals between a characteristic curve of the longitudinal force and a corresponding curve of the longitudinal force calculated in the tire dynamic model, the second sum of squared residuals representing a sum of squared residuals between a characteristic curve of a lateral force and a corresponding curve of the lateral force calculated in the tire dynamic model, the third sum of squared residuals representing a sum of squared residuals between a characteristic curve of the self-aligning torque and a corresponding curve of the self-aligning torque calculated in the tire dynamic model, wherein the weighting coefficients are obtained from information of variations of values of the respective characteristic curves of the longitudinal force, the lateral force and the self-aligning torque that change in dependence on the slip ratio.

The values of the tire dynamic element parameters are preferably derived in the tire characteristic amending step by using an effective slip angle, the effective slip angle being obtained by modifying a given slip angle through a torsional deformation of the tire dynamic model caused by the self-aligning torque.

The values of the tire dynamic element parameters derived in the tire characteristic amending step preferably include an adhesive friction coefficient and a sliding friction coefficient between a tread member of the tire dynamic model and the road surface, and a shape stipulation coefficient that stipulates a shape of a contact pressure distribution.

The tire dynamic model preferably calculates, when a slip angle and the slip ratio in the braking/driving direction are given as the slip ratio, the longitudinal force, a lateral force, and the self-aligning torque by using a sliding direction of the tire dynamic model in a sliding region in the contact patch, the sliding direction being determined by the given slip angle and slip ratio in the braking/driving direction.

The present invention also provides a tire designing method, with a concept of a tire friction ellipse employed, of designing a tire achieving desired performance by performing a vehicle traveling simulation using information of a characteristic curve expressing slip ratio dependency of at least one of a tire axial force and a self-aligning torque that act on a tire rotation axis at a time when a slip ratio is given to the tire and information of a vehicle specification. The method comprises:

a model creating step of creating a vehicle model by using the information of the vehicle specification;

a performance evaluating step of: setting values of a plurality of tire dynamic element parameters determining the characteristic curve for a tire dynamic model constructed using the plurality of tire dynamic element parameters, providing values of approximate expression parameters for stipulating a nonlinear approximation to the vehicle, the values of approximate expression parameters being obtained by approximating a characteristic curve with the nonlinear approximation, the characteristic curve being calculated using the values of the tire dynamic element parameters for the tire dynamic model, performing the traveling simulation under a predetermined traveling condition by using the vehicle model, and evaluating a vehicle performance by using a result of the traveling simulation;

a tire characteristic amending step of: amending the values of the approximate expression parameters when the vehicle model fails to satisfy target performance in the performance evaluating step, performing the traveling simulation by giving the amended value to the vehicle model, performing the vehicle performance evaluation by using a result of the traveling simulation, and deriving the values of the tire dynamic element parameters based on the tire dynamic model by using a characteristic curve which is calculated from the nonlinear approximation stipulated by the amended value of the approximate expression parameters; and a tire characteristic determining step of: determining, when the vehicle model satisfies predetermined performance, the derived values of the tire dynamic element parameters as a tire target characteristic, and outputting the determined target characteristic, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

Preferably, the tire dynamic model calculates, at a time when a slip angle is given to the tire dynamic model, lateral force, and calculates, at the time when the slip angle is given, the self-aligning torque by separately calculating a lateral force based torque component generated by the lateral force that acts on the contact patch of the tire dynamic model and a longitudinal force based torque component generated by the longitudinal force that acts on the contact patch of the tire dynamic model.

It is preferable that the tire axial force at least includes a lateral force that acts in a direction parallel to the tire rotation axis when a slip angle is given to the tire dynamic model; and the calculating of the characteristic curve by using the tire dynamic model includes calculating a characteristic curve of the lateral force, and also a characteristic curve expressing slip ratio dependency of a self-aligning torque generated by the lateral force and the longitudinal force that act between the tire dynamic model and the road surface.

It is preferable that the values of tire dynamic element parameters are derived in the tire characteristic amending step so that a value of a combined sum of squared residuals obtained through weighted addition of a fourth sum of squared residuals, a fifth sum of squared residuals, and a sixth sum of squared residuals by using weighting coefficients becomes equal to or smaller than a predetermined value, the fourth sum of squared residuals representing a sum of squared residuals between a characteristic curve of the longitudinal force and a corresponding curve of the longitudinal force calculated in the tire dynamic model, the fifth sum of squared residuals representing a sum of squared residuals between a characteristic curve of a lateral force and a corresponding curve of the lateral force calculated in the tire dynamic model, the sixth sum of squared residuals representing a sum of squared residuals between a characteristic curve of the self-aligning torque and a corresponding curve of the self-aligning torque calculated in the tire dynamic model, where the weighting coefficients are obtained from information of variations of values of the respective characteristic curves of the longitudinal force, the lateral force and the self-aligning torque that change in dependence on the slip ratio.

The values of the tire dynamic element parameters are preferably derived in the tire characteristic amending step by using an effective slip angle, the effective slip angle being obtained by modifying a given slip angle through a torsional deformation of the tire dynamic model caused by the self-aligning torque.

The values of the tire dynamic element parameters derived in the tire characteristic amending step preferably include an adhesive friction coefficient and a sliding friction coefficient between a tread member of the tire dynamic model and the road surface, and a shape stipulation coefficient that stipulates a shape of a contact pressure distribution.

The tire dynamic model is preferably used for calculating, when a slip angle and the slip ratio in the braking/driving direction are given as the slip ratio, the longitudinal force, a lateral force, and the self-aligning torque by using a sliding direction of the tire dynamic model in a sliding region in the contact patch, the sliding direction being determined by the given slip angle and slip ratio in the braking/driving direction.

The tire designing method may further comprises designing a tire by using the values of the tire dynamic element parameters determined in the tire characteristic determining step, and determining a combination of a tire member material and a tire structure for achieving the values.

The tire dynamic model used in each method according to the present invention is a model which allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force. Therefore, as will be described in the following embodiment, it becomes possible to reproduce a negative gradient that actual measured tire data indicates in a tire friction ellipse with a tire dynamic model, which makes it possible to realize a high-precision vehicle traveling simulation.

With the vehicle designing method according to the present invention, a traveling simulation is performed by providing approximate expression parameters to a vehicle model, and when the vehicle model does not satisfy target performance in a performance evaluation at that time, values of the approximate expression parameters are amended and the traveling simulation is performed again. When doing so, a characteristic curve is calculated from a nonlinear approximation stipulated by the amended approximate expression parameters and values of tire dynamic element parameters are derived from this characteristic curve based on a tire dynamic model. In addition, the tire dynamic model used here is a model in which a center position of a contact patch of a tire moves in accordance with a longitudinal force that occurs as a tire axial force so that a position of the contact patch against a road surface moves in a longitudinal direction by the longitudinal force, which is the same phenomenon as in the case of an actual tire. Therefore, the approximate expression parameters for the nonlinear approximation that can be expressed as a tire dynamic characteristic under a braking/driving condition are linked with the tire dynamic element parameters including various kinds of tire stiffness, so it becomes possible to determine values of the approximate expression parameters as parameters that are realizable with an actual tire. Also, the values of the tire dynamic element parameters are derived each time the values of the approximate expression parameters are amended, so when the vehicle model satisfies predetermined performance, the values of the tire dynamic element parameters that are easy for a tire manufacturer to understand are also determined. Therefore, it becomes possible for a car manufacturer to efficiently present these values of the tire dynamic element parameters as a tire requisite characteristic.

In addition, a tire characteristic exerts a significant influence on vehicle performance. Therefore, a tire characteristic amendment step, in which the tire characteristic is amended, is performed after a vehicle specification amendment step, in which information of a vehicle specification is amended and a traveling simulation and a vehicle performance evaluation are performed, is performed at least once, so it becomes possible to efficiently achieve a part of target performance, which is unachievable with the vehicle specification, with the tire characteristic, to thereby make it possible to perform vehicle designing including tire designing with efficiency.

With the tire designing method according to the present invention, a traveling simulation is performed by providing approximate expression parameters to a vehicle model and when the vehicle model does not satisfy target performance in a performance evaluation at that time, the approximate expression parameters are amended and the traveling simulation is performed again. When doing so, a characteristic curve is calculated from a nonlinear approximation stipulated by the amended approximate expression parameters and values of tire dynamic element parameters are derived from this characteristic curve based on a tire dynamic model. Therefore, the approximate expression parameters for the nonlinear approximation that can be expressed as a cornering characteristic of a tire, to which a slip angle and a slip ratio in a braking/driving direction are given, are linked with the tire dynamic element parameters including various kinds of tire stiffness, so it becomes possible even for an unskilled designer to efficiently determine a tire design specification using parameters that are realizable with an actual tire.

The tire dynamic element parameters are parameters that are easy for a tire manufacturer to understand and conventionally they have been relatively well known which tire size and shape should be modified to adjust the tire dynamic element parameters, so it becomes possible for the tire manufacturer to perform tire designing with ease based on a determined tire design specification.

BRIEF DESCRIPTION OF THE DRAWINGS

In the accompanying drawings:

FIGS. 7A to 7C are explanatory diagrams of the tire dynamic model used in the methods according to the present invention;

FIG. 15 shows examples of characteristic curves used in the methods according to the present invention;

FIG. 16 shows examples of characteristic curves used in the methods according to the present invention;

FIGS. 21A and 21B each shows other examples of the results of the tire friction ellipses obtained in the methods according to the present invention.

DETAILED DESCRIPTION OF THE INVENTION

A tire designing method and a vehicle designing method in which a concept of a tire friction ellipse is employed, a tire characteristic calculation method, a tire dynamic parameter value derivation method, and a vehicle traveling simulation method according to the present invention will now be described in detail by way of an embodiment illustrated in the accompanying drawings.

Figure 1:
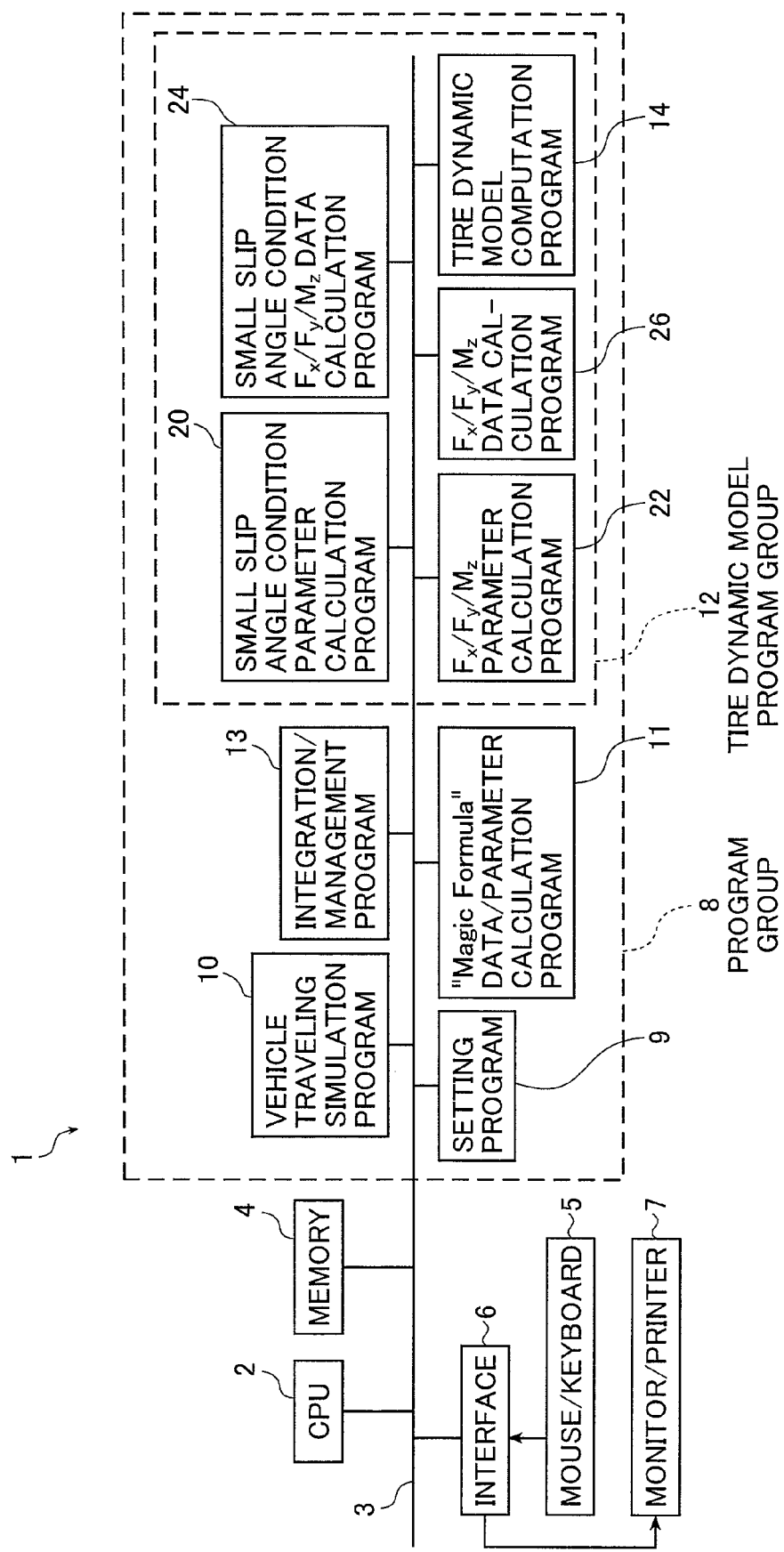
FIG. 1 is a block diagram of an apparatus according to an embodiment that implements the methods of the present invention.

FIG. 1 is a construction diagram of an apparatus 1 that implements the vehicle designing method according to the present invention. The apparatus 1 is constructed by using a computer that performs the vehicle designing method by executing various programs.

The apparatus 1 is an apparatus that determines a vehicle specification and a tire requisite characteristic, which realize a vehicle having desired performance, from data of the vehicle specification (such as wheel base, height of a gravitational center, total weight of the vehicle, and weight distribution between front and rear wheels of the vehicle) and information of a tire dynamic characteristic (tire cornering characteristic and braking/driving characteristic) at the time when braking/driving is given to a tire that is a construction component of the vehicle according to a slip ratio (this characteristic will be hereinafter referred to as "dynamic characteristic under a braking/driving condition").

The apparatus 1 includes a CPU 2 that manages and controls each site of the computer and execution of each program, a memory 4 in which various conditions and computation results are stored through a bus 3, an input operation system 5 such as a mouse or a keyboard which is used to designate and input various conditions and various kinds of information, an interface 6 that connects the input operation system 5 to the bus 3, an output device 7 that displays a screen for input of various conditions and information and results of execution of various programs such as a simulation result and performs printout, and a program group 8 that includes various programs described below and realizes functions of the apparatus 1.

Here, the program group 8 includes a setting program 9, a vehicle traveling simulation program 10, a "Magic Formula" data/parameter calculation program 11, a tire dynamic model program group 12, and an integration/management program 13.

The setting program 9 sets data of a vehicle specification and values of the "Magic Formula" parameters. The vehicle traveling simulation program 10 performs a vehicle traveling simulation using a vehicle model. The "Magic Formula" data/parameter calculation program 11 calculates data of a characteristic curve of the dynamic characteristic under the braking/driving condition of a tire when values of the "Magic Formula" parameters are given, and calculates values of the "Magic Formula" parameters when a characteristic curve of the dynamic characteristic under the braking/driving condition is given. The tire dynamic model program group 12 derives values of multiple tire dynamic element parameters (hereinafter referred to as "dynamic element parameters") based on a tire dynamic model to be described later when a characteristic curve of the dynamic characteristic under the braking/driving condition is given, and calculates characteristic curves of dynamic characteristics of a longitudinal force, a lateral force, and a self-aligning torque (hereinafter referred to as "torque") using a tire dynamic model when values of dynamic element parameters in the tire dynamic model are given. The integration/management program 13 integrally performs control and management of the programs described above, amends values of the "Magic Formula" parameters in accordance with a simulation result, and makes a vehicle performance evaluation based on the simulation result.

Here, the characteristic curve of the dynamic characteristic under the braking/driving condition is a curve that expresses dependency of a lateral force and a torque on a slip angle at the time when a slip ratio in a braking/driving direction and an applied load are set to constant values, or a curve that expresses slip ratio dependency of lateral force and torque in the braking/driving direction of the tire at the time when the slip angle and the applied load are set to constant values.

It should be noted here that the "Magic Formula" parameters are approximate expression parameters that stipulate a nonlinear approximation at the time when the characteristic curve of the dynamic characteristic is approximated with a nonlinear approximation expressed by formula (20) given above. Note that the nonlinear approximation in the present invention is not limited to "Magic Formula" expressed by formula (20) and may be a nonlinear approximation using an exponential function or a polynomial, for instance.

The setting program 9 is a portion that sets the data of the vehicle specification and the values of the "Magic Formula" parameters, and data of a wheel base, the height of a gravitational center, a vehicle total weight, a weight distribution between vehicle front and rear wheels, a suspension characteristic, and the like is set through the input operation system 5. Alternatively, data stored in the memory 4 is called and set. Also, the values of the "Magic Formula" parameters are set by calling data stored in the memory 4.

The vehicle traveling simulation program 10 performs a vehicle traveling simulation by creating a vehicle model in accordance with the data of the vehicle specification, calling a traveling simulation condition given from the operation input system 5 or a traveling condition stored in the memory 4, and giving the values of the "Magic Formula" parameters set in the created vehicle model. For instance, the values of the "Magic Formula" parameters are values for which multiple slip ratios in the baking/driving direction and applied loads are set and which approximates the characteristic curve of the slip angle dependency for each of the slip ratios in the baking/driving direction and the applied loads. Alternatively, the values of the "Magic Formula" parameters are values for which multiple slip angles and applied loads are set and which approximates the characteristic curve of the slip ratio dependency in the braking/driving direction for each of the slip angles and the applied loads.

The vehicle model used in the traveling simulation is a analysis model for mechanism and is a model created by an analytic software for mechanism "ADAMS", for instance. Alternatively, the vehicle model is an analytic model defined by motion analysis software "CarSim" or a designing software for controlling system "MatLab".

The traveling simulation condition concerns a vehicle traveling speed including braking/driving, a steering angle, a profile shape of a road surface, and the like and different traveling simulation conditions are set in accordance with performance to be evaluated.

The traveling simulation is performed by using the analysis software for mechanism "ADAMS (trade name, manufactured by MSC, Software Corporation)". Alternatively, computation in the traveling simulation is performed using the motion analysis software for controlling system "CarSim®" or the designing software for controlling system "MatLab®".

The "Magic Formula" data/parameter calculation program 11 calculates, when values are given to the "Magic Formula" parameters, values of the longitudinal force, the lateral force, and the self-aligning torque using the parameter values in accordance with formula (20) described above and obtains characteristic curves of the longitudinal force, the lateral force, and the self-aligning torque. For instance, when the values of the "Magic Formula" parameters are given for each of slip ratios in the braking/driving direction and applied loads, characteristic curves expressing dependency of the longitudinal force, the lateral force, and the self-aligning torque on the slip angle are obtained for each of the slip ratios in the braking/driving direction and the applied loads using them. Alternatively, when the values of the "Magic Formula" parameters are given for each of slip angles and applied loads, characteristic curves expressing dependency of the longitudinal force, the lateral force, and the self-aligning torque on the slip ratio in the braking/driving direction are obtained for each of the slip angles and the applied loads using them. Also, by using the values of the "Magic Formula" parameters, it is possible to obtain characteristic curves expressing load dependency of the longitudinal force, the lateral force, and the self-aligning torque under the slip angle of one degree at the time when the slip ratio in the braking/driving direction keeps a constant value.

On the other hand, when the characteristic curves of the longitudinal force, the lateral force, and the self-aligning torque are given to the "Magic Formula" data/parameter calculation program 11, the values of the "Magic Formula" parameters are obtained from those characteristic curves. Although the method of obtaining the parameter values is not particularly limited, it is preferable to use a Newton-Raphson method, for instance, since formula (20) is nonlinear with respect to the parameters. When the characteristic curves are given for each of slip ratios in the braking/driving direction and applied loads, for instance, the values of the parameters are obtained for each of the slip ratios in the braking/driving direction and the applied loads. Similarly, when the characteristic curves are given for each of slip angles and applied loads, the value of the parameter is obtained for each of the slip angles and the applied loads.

The tire dynamic model program group 12 will be described in detail later.

The integration/management program 13 integrally performs control and management of the programs described above, amends the data of the vehicle specification and the values of the "Magic Formula" parameters in accordance with a result of a vehicle traveling simulation, and makes a vehicle performance evaluation based on the simulation result. When predetermined evaluation data obtained as a result of the performance evaluation does not reach a set target value, the integration/management program 13 repeatedly amends the data of the vehicle specification and the values of the "Magic Formula" parameters until the evaluation data satisfies the set target value. A method for the amendment is not specifically limited. The data of the vehicle specification or the values of the "Magic Formula" parameters may be amended by a modification quantity which is predetermined in advance, for instance. When the evaluation data obtained as a result of the performance evaluation reaches the set target value, the amended data of the vehicle specification, values of the "Magic Formula" parameters, and dynamic element parameters to be described later derived from the values of the "Magic Formula" parameters are determined as a design specification that realizes desired performance. The dynamic element parameters are determined as a tire requisite characteristic. Such a tire requisite characteristic is output to the output device 7.

The tire dynamic model program group 12 includes a tire dynamic model computation program 14 that expresses the tire dynamic model with an analytic expression and calculates the longitudinal force, the lateral force, and the torque by using set values of the dynamic element parameters, and programs that derive values of various dynamic element parameters by causing the tire dynamic model computation program 14 to perform computation through a predetermined sequence or calculate the longitudinal force, the lateral force, and the torque under a force-balanced state (equilibrium state) in the tire dynamic model. Note that the values of the various dynamic element parameters derived by the tire dynamic model program group 12 or the characteristic curves of the longitudinal force, the lateral force, and the torque calculated by the tire dynamic model program group 12 are output to the output device 7.

Examples of the dynamic element parameters calculated based on the tire dynamic model include:

(a) lateral stiffness KY determined by shear stiffness in a lateral direction of a tire tread part;

(b) longitudinal stiffness Kx determined by shear stiffness in a longitudinal direction (braking/driving direction) of the tire tread part;

(c) torsional stiffness Ay about a tire center axis of the tire tread part;

(d) a static coefficient μs between a road surface and a tire;

(e) a dynamic coefficient μd (μd0, bv) between the road surface and the tire;

(f) a lateral bending coefficient ε of a belt part;

(g) torsional compliance (1/Gmz) that is a reciprocal of the torsional stiffness about the tire center axis of the tire;

(h) a coefficient n that stipulates a contact pressure distribution of a contact patch during occurrence of the lateral force;

(i) a coefficient Cq that expresses a degree of a bias of the contact pressure distribution;

(j) a movement coefficient Cxc that indicates a degree of a movement in the longitudinal direction of a center position of the contact patch of the tire; and (k) an effective contact length l at the time of the occurrence of the lateral force.

Figure 6A:
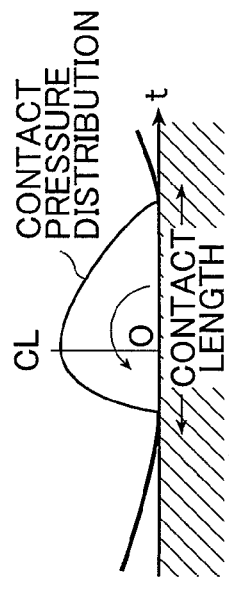
FIGS. 6A to 6D are explanatory diagrams of the tire dynamic model used in the methods according to the present invention.

Here, the lateral stiffness Ky, the longitudinal stiffness Kx, and the torsional stiffness Ay are respectively a stiffness parameter in the lateral direction against a shear deformation of the tire tread part, a stiffness parameter in the longitudinal direction, and a torsional stiffness parameter about the tire center axis (about an axis that passes through the center of the tire and extends perpendicular to the contact patch). Also, the lateral bending coefficient ε is a tire stiffness parameter against a lateral bending deformation, and Gmz of the torsional compliance (1/Gmz) is a stiffness parameter against a tire torsional deformation. In addition, the lateral direction that is a direction in which the lateral force occurs refers to an axis direction of a rotation axis of the tire. Therefore, in a case where the tire rolls to travel straight ahead, the lateral direction becomes identical with a right-left direction with respect to a traveling direction. However, in a case where the tire rolls at a slip angle, the lateral direction shifts with respect to the traveling direction of the tire by the slip angle. The longitudinal direction refers to a direction that is parallel to a road surface which the tire contacts and is orthogonal to the axis direction of the rotation axis of the tire. Also, the tire center axis (that means an axis CL of FIG. 6A or 6B) is an axis that is orthogonal to the rotation axis along which the tire rolls, passes through a center plane in a widthwise direction of the tire, and is orthogonal to the road surface.

The tire dynamic model program group 12 has four different kinds of sequences. Correspondingly to the respective sequences, the tire dynamic model program group 12 includes a small slip angle condition parameter calculation program 20, an $F_x/F_y/M_z$ parameter calculation program 22, a small slip angle condition $F_x/F_y/M_z$ data calculation program 24, and an $F_x/F_y/M_z$ data calculation program 26.

The small slip angle condition parameter calculation program 20 determines the values of the dynamic element parameters described above from curves expressing load dependency of the longitudinal force, the lateral force, and the self-aligning torque at a slip angle of one degree. The $F_x/F_y/M_z$ parameter calculation program 22 determines the values of the dynamic element parameters described above from given characteristic curves of the longitudinal force, the lateral force, and the self-aligning torque. The small slip angle condition $F_x/F_y/M_z$ data calculation program 24 obtains calculated data of the longitudinal force, the lateral force, and the self-aligning torque under a force-balanced state at the slip angle of one degree in the tire dynamic model. The $F_x/F_y/M_z$ data calculation program 26 calculates data of the longitudinal force, the lateral force, and the torque under a force-balanced state in the tire dynamic model.

It should be noted that more detailed functions of the small slip angle condition parameter calculation program 20, the $F_x/F_y/M_z$ parameter calculation program 22, the small slip angle condition $F_x/F_y/M_z$ data calculation program 24, and the $F_x/F_y/M_z$ data calculation program 26 will be described later.

The tire dynamic model computation program 14 is a computation portion that outputs, when the values of the longitudinal force, the lateral force, and the torque on the characteristic curves are inputted, corresponding calculated data (longitudinal force $F_x'$, lateral force $F_y'$, and torque $M_z'$) as a processing result which is calculated in the tire dynamic model using the inputted values, and returns the processing result to the small slip angle condition parameter calculation program 20, the $F_x/F_y/M_z$ parameter calculation program 22, the small slip angle condition $F_x/F_y/M_z$ data calculation program 24, or the $F_x/F_y/M_z$ data calculation program 26. The values of the longitudinal force, the lateral force, and the torque on the characteristic curves inputted into the tire dynamic model computation program 14 are values calculated by using the values of the "Magic Formula" parameters set by the setting program 9 or the values of the "Magic Formula" parameters amended by the integration/management program 13.

FIGS. 2, 3, 4, 5A to 5E, 6A to 6D, 7A to 7C, and 8 are each an explanatory diagram of the tire dynamic model.

Figure 2:
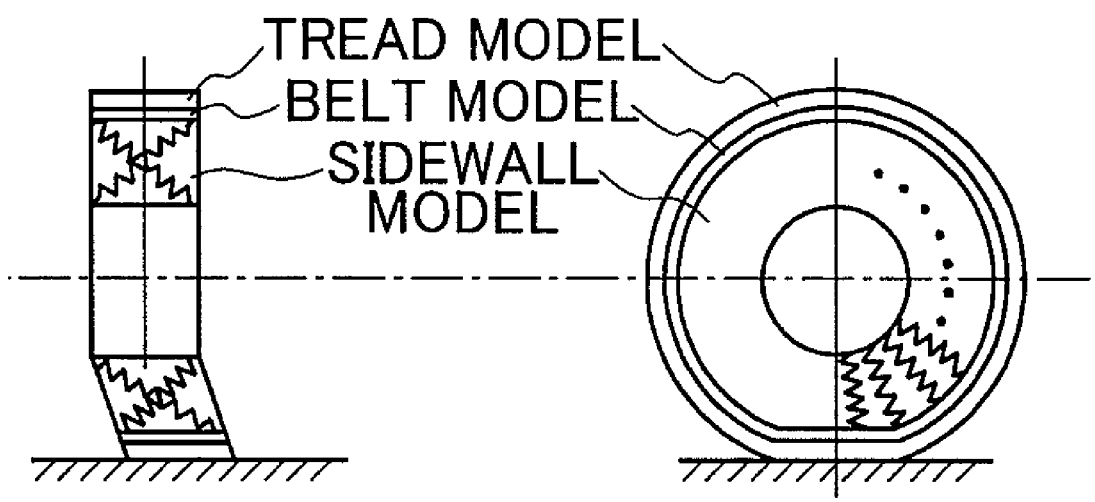
FIG. 2 is an explanatory diagram of a tire dynamic model used in the methods according to the present invention.

As shown in FIG. 2, the tire dynamic model includes a sidewall model composed of multiple spring elements representing a spring characteristic of a sidewall on a rigid cylindrical member, a belt model being an elastic ring body connected to those spring elements, and a tread model composed of an elastic element connected to a surface of the elastic ring body.

Figure 3:
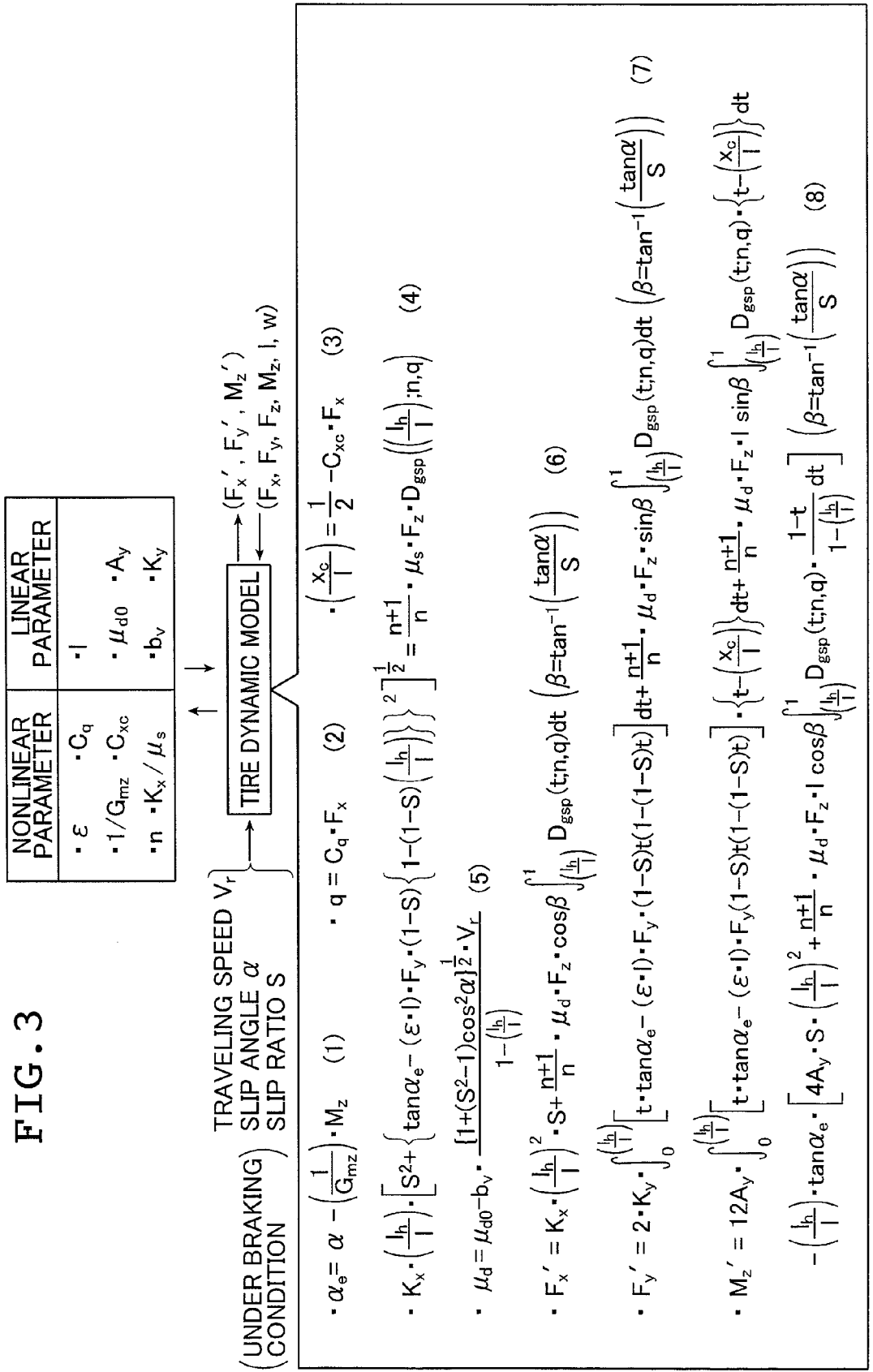
FIG. 3 is an explanatory diagram of the tire dynamic model used in the methods according to the present invention.
Figure 4:
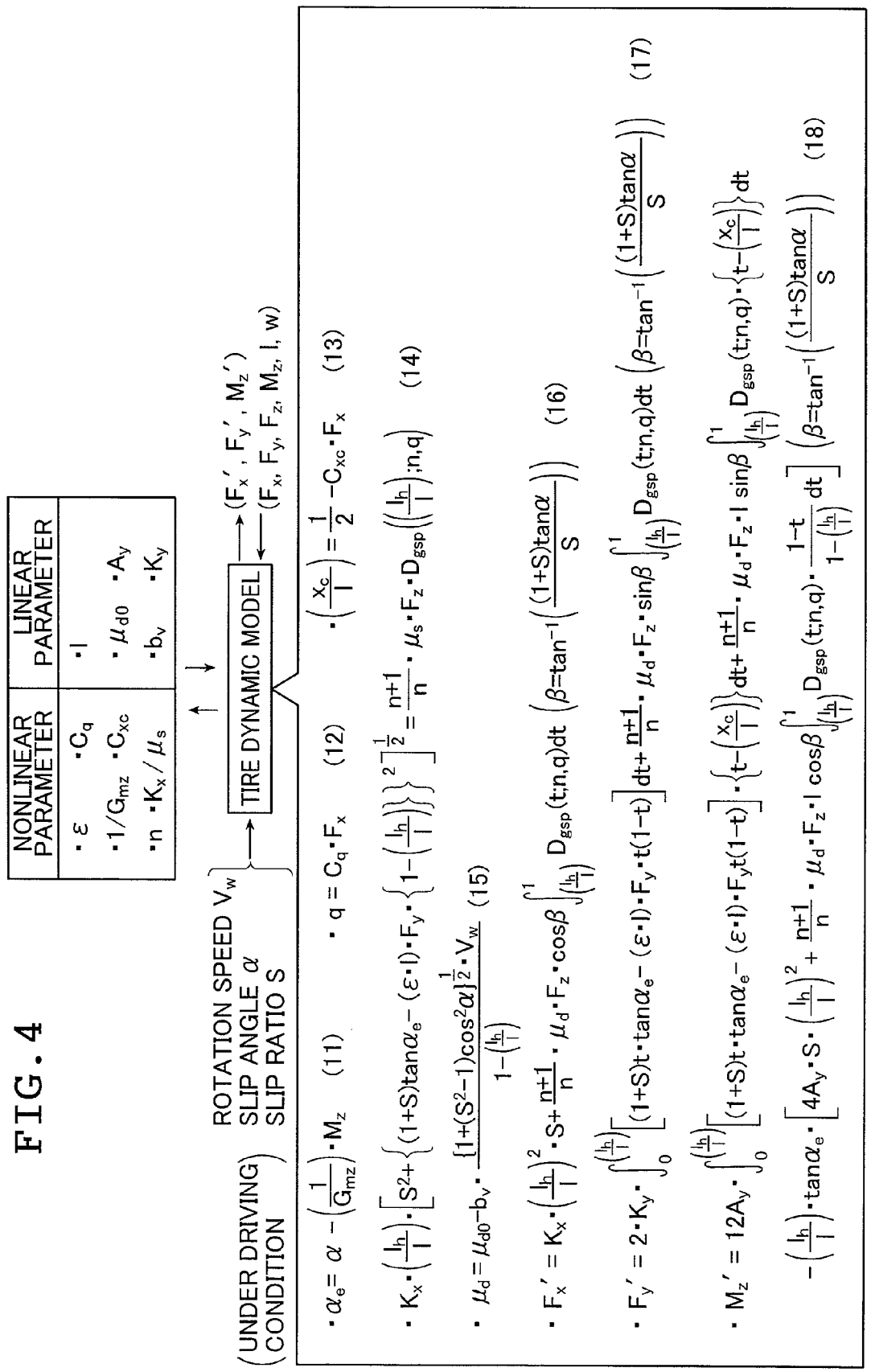
FIG. 4 is an explanatory diagram of the tire dynamic model used in the methods according to the present invention.

More specifically, in the above-mentioned tire dynamic model determined by the tire dynamic element computation program 14, the following processing is performed. FIG. 3 shows the contents of processing at the time when the slip ratio S in the braking/driving direction is in a braking state, and FIG. 4 shows the contents of processing at the time when the slip ratio S in the braking/driving direction is in a driving state.

In the case of braking, as shown in FIG. 3, the values of the longitudinal force, the lateral force, and the torque calculated with formulae (1) to (8) of FIG. 3 (hereinafter referred to as "longitudinal force $F_x'$", "lateral force $F_y'$" and "torque $M_z'$") are obtained by setting the values of the dynamic element parameters including linear parameters such as the lateral stiffness $K_y$ and the torsional stiffness $A_y$ and nonlinear parameters such as the lateral bending coefficient $\epsilon$ of the belt part and the coefficient $C_q$, and by inputting the slip angle $\alpha$, the slip ratio S at the time of braking, the traveling speed $V_r$, the longitudinal force $F_x$, the lateral force $F_y$, and the torque $M_z$. Needless to say, only when a difference between the inputted values of the longitudinal force $F_x$, the lateral force $F_y$, and the torque $M_z$ and the calculated values of the longitudinal force $F_x'$, the lateral force $F_y'$, and the torque $M_z'$ is equal to or smaller than a predetermined value, that is, the values of the longitudinal force $F_x$, the lateral force $F_y$, and the torque $M_z$ and the values of the longitudinal force $F_x'$, the lateral force $F_y'$, and the torque $M_z'$ approximately match with each other (converge and are under a force-balanced state in the tire dynamic model), the values of the longitudinal force $F_x'$, the lateral force $F_y'$, and the torque $M_z'$ are determined as values of the longitudinal force, the lateral force, and the torque of a tire that realize the force-balanced state.

It should be noted that the linear parameters refer to dynamic element parameters expressed in formulae (6) to (8) in a linear form, whereas the nonlinear parameters refer to dynamic element parameters expressed in formulae (6) to (8) in a nonlinear form.

Figures 5A, 5B:
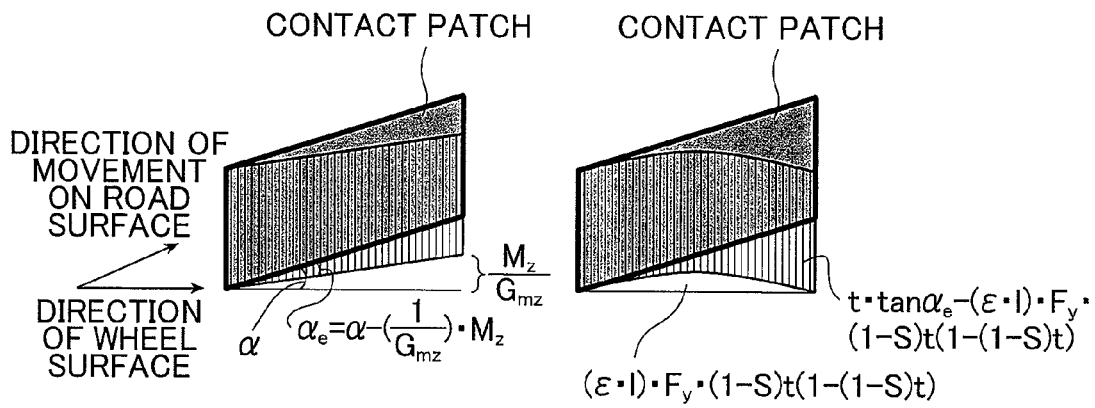
FIGS. 5A to 5E are explanatory diagrams of the tire dynamic model used in the methods according to the present invention.

As shown in FIG. 5A and expressed by formula (1), the tire dynamic element computation program 14 calculates an effective slip angle $\alpha_e$ by calculating a twisting shift angle from the inputted torque $M_z$ and torsional compliance ($1/G_{mz}$) and subtracting the twisting shift angle from the given slip angle $\alpha$. The reason why the effective slip angle $\alpha_e$ is calculated in this manner is that the torque has a twist back action, in which the torque acts on the tire itself so as to reduce the given slip angle, when the torque $M_z$ is larger than zero. Therefore, when the torque $M_z$ is larger than zero, as shown in FIG. 5A, the effective slip angle $\alpha_e$ becomes smaller than the actually given slip angle $\alpha$.

Further, according to formula (2), a bias coefficient q that stipulates a shape of the contact pressure distribution is calculated from the longitudinal force $F_x$. The bias coefficient q is a parameter that indicates the shape of the contact pressure distribution in which the contact pressure distribution under a straight traveling state at the slip angle $\alpha$ of zero (see FIG. 6A) is biased as a result of occurrence of the longitudinal force $F_x$ in a forward traveling direction (toward a leading edge in the contact patch) as shown in FIG. 6B. When this contact pressure distribution is referred to as p(t) (t is a coordinate position normalized by a contact length in a case where a t-axis is set in a backward traveling direction of FIGS. 6A and 6B), the shape of the contact pressure distribution p(t) is stipulated by a function $D_{gsp}$ (t; n, q) expressed by formula (9) in FIG. 6B.

Figure 6C:
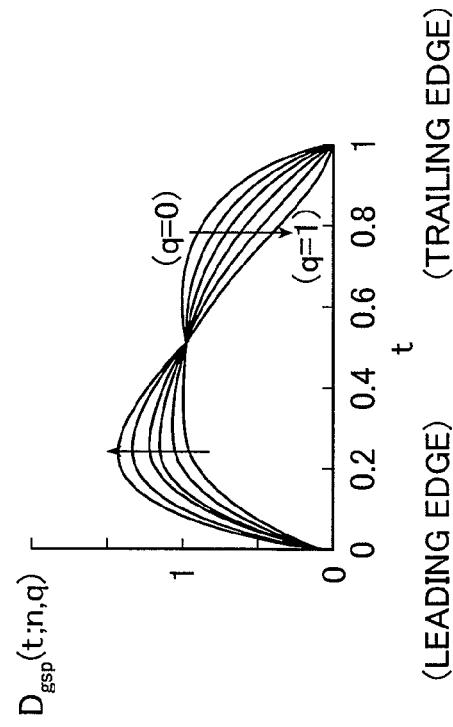
Figure 6B:
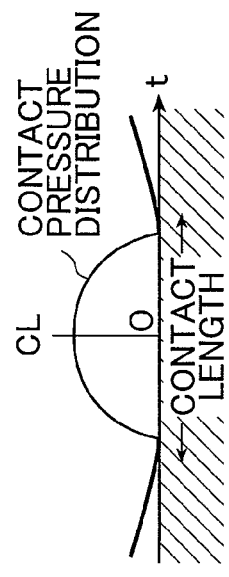
Figure 6D:
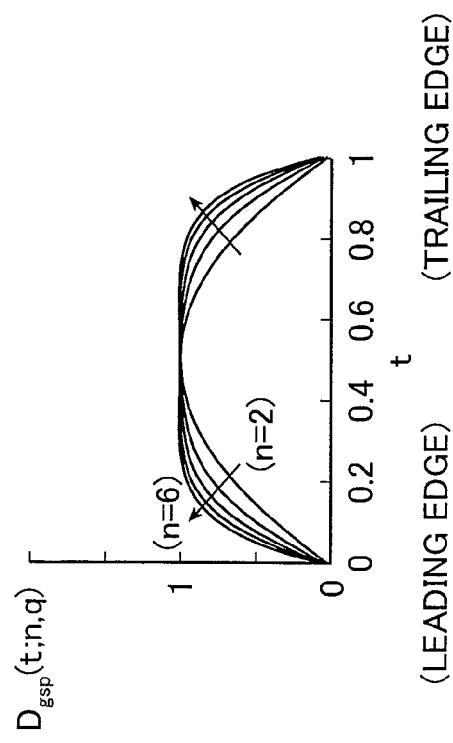

Here, a coefficient n in the function $D_{gsp}$ (t; n, q) is a coefficient that stipulates the contact pressure distribution of the contact patch during the occurrence of the lateral force and stipulates the contact pressure distribution so as to be angulated (increased in curvature) in the vicinity of the leading edge and trailing edge of the contact pressure distribution as shown in FIG. 6C. Also, a setting is made so that as shown in FIG. 6D, as the coefficient q increases from zero to one, a peak position of the contact pressure distribution moves toward a leading edge side. As described above, the coefficients q and n are shape stipulation coefficients that stipulate the shape of the contact pressure distribution.

Figure 5C:
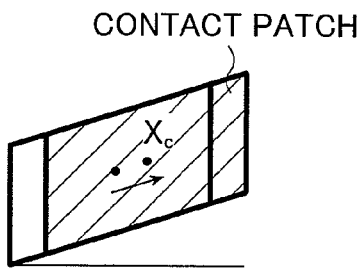
Figure 5D:
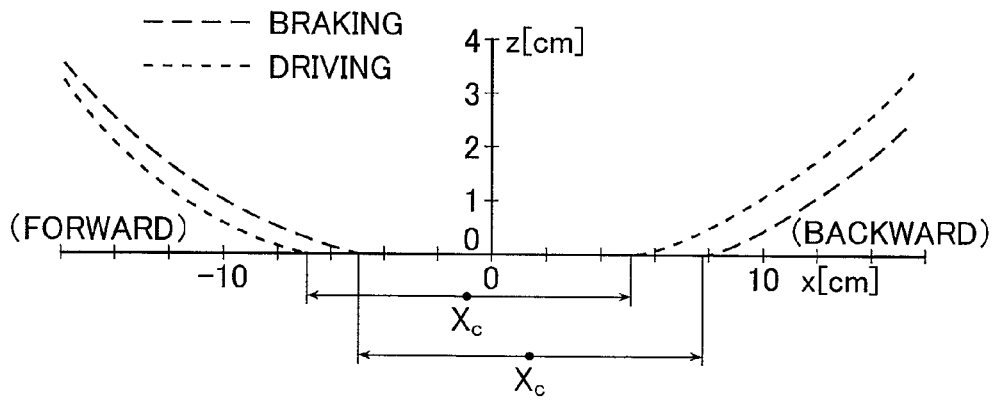

Further, according to formula (3), an amount of a movement of the center position of the contact patch of the tire in the longitudinal direction due to the occurrence of the longitudinal force $F_x$ is calculated. As shown in FIG. 5C, according to formula (3), a value ($x_c/l$) indicating the degree of the movement of the contact center position of the tire in the longitudinal direction at the time of the occurrence of the longitudinal force $F_x$ is calculated in association with the longitudinal force $F_x$. In other words, the tire dynamic model is constructed so that when the slip ratio in the braking/driving direction is given, the position of the contact patch of the tire against the road surface is allowed to moves in the longitudinal direction due to the longitudinal force, which occurs as a tire axial force, and the center position of the contact patch moves in accordance with the longitudinal force that occurs. The value ($x_c/l$) indicating the movement amount is used in the second term of formula (8) to be described later for calculation of the torque $M_z$. Here, l is a contact length. The reason why the movement of the center position of the contact path of the tire is determined with formula (3) is that, as to an actual tire deformation in the vicinity of the contact patch at the time of tire braking, a deformation in the vicinity of the contact patch of the tire at the time of braking and that at the time of driving are different from each other and the contact center position moves due to the braking/driving as shown in FIG. 5D. Note that FIG. 5D shows an actual measurement result of a deformation of a tire of 195/65R15 91H (internal pressure of 230 kPa, load of 4 kN, and traveling speed of 60 km/h) with a laser scanner.

In addition, according to formula (4), a boundary position ($l_h/l$) between sliding friction and adhesive friction in the contact patch, which occur when the slip ratio (slip ratio S in the braking/driving direction and slip angle $\alpha$) is large, is calculated. The boundary position ($l_h/l$) is defined as follows.

The maximum friction curves shown in FIGS. 7A to 7C are obtained by multiplying the adhesive friction coefficient $\mu_s$ by the contact pressure distribution p(t). The tire tread part which contacts the road surface on its leading edge is gradually sheared in the lateral direction by the road surface due to the slip angle α as it moves toward the trailing edge. As a result, a lateral shear force (adhesive frictional force) occurs to the tread part. In addition, the tread part is gradually sheared in the longitudinal direction by the road surface due to the slip ratio S in the braking/driving direction that occurs due to a difference between a moving speed of the road surface (traveling speed of the tire) and the rotation speed of the tire. As a result, a longitudinal shear force (adhesive frictional force) occurs to the tread part. A shear force that occurs between the tire and the road surface is expressed by a resultant force of the lateral shear force and the longitudinal shear force.

When this resultant force of the shear forces gradually increases to reach the maximum friction curve, the tire tread part, which adheres to the road surface, starts sliding to generate a sliding frictional force in accordance with a sliding friction curve obtained by multiplying the sliding friction coefficient $\mu_d$ by the contact pressure distribution p(t). In FIG. 7A, a region on a leading edge side with respect to the boundary position ($l_h$/l) is an adhesive region in which the tire tread part adheres to the road surface, whereas a region on a trailing edge side is a sliding region in which the tire tread part slides on the road surface. The boundary position ($l_h$/l) is determined by formula (4).

As can be seen from FIGS. 7A to 7C, a ratio between the adhesive region and the sliding region greatly varies depending on the slip angle α. Lateral frictional forces in the adhesive region and the sliding region, that is, lateral force components are integrated along a tire width direction, whereby it is possible to calculate the lateral force $F_y'$. Further, by calculating a moment about the tire center O, it is possible to calculate the torque $M_z'$.

In a similar manner, also in the longitudinal direction, longitudinal frictional forces in the adhesive region and the sliding region, that is, longitudinal force components are integrated along the tire width direction, whereby it is possible to calculate the longitudinal force $F_x'$.

The longitudinal force $F_x'$ is calculated with formula (6) separately for the adhesive region and the sliding region described above. Further, with formulae (7) and (8), the lateral force $F_y'$ and the torque $M_z'$ are calculated using the effective slip angle $\alpha_e$.

It should be noted that as expressed by formula (5), the sliding friction coefficient $\mu_d$ is stipulated to have sliding speed dependency (second term on the right side of formula (5)). A coefficient indicating the sliding speed dependency changes in accordance with the slip angle α and the slip ratio S in the braking/driving direction.

FIGS. 5A to 5C show the effective slip angle $\alpha_e$, the adhesive lateral force component reduced by a deformation of the belt, and the movement of the contact patch center position on the schematically illustrated contact patch, which are behaviors expressed by formulae (6) to (8).

FIG. 5A shows a state in which as described above, when the slip angle α is given, the toque that occurs due to the slip angle α acts on the tire itself so as to reduce the slip angle α to the effective slip angle $\alpha_e$. FIG. 5B shows a relation between a lateral displacement caused by the effective slip angle $\alpha_e$ and a lateral displacement caused by the lateral bending deformation of the belt. FIG. 5C shows that the contact patch of the tire moves in the longitudinal direction due to the longitudinal force.

Next, formulae (6) to (8) will be described in more detail.

The longitudinal force $F_x'$ is calculated with formula (6) by obtaining a sum of two terms (two longitudinal force components). The first term corresponds to a result of integration within an integration range of zero to ($l_h$/l) and represents an adhesive longitudinal force component that occurs in the adhesive region. The second term corresponds to integration within an integration range of ($l_h$/l) to one and represents a sliding longitudinal force component that occurs in the sliding region.

The lateral force $F_y'$ is calculated with formula (7) by obtaining a sum of two terms (two lateral force components). The first term corresponds to integration within the integration range of zero to ($l_h$/l) and represents an adhesive lateral force component that occurs in the adhesive region. The second term corresponds to integration within the integration range of ($l_h$/l) to one and represents a sliding lateral force component that occurs in the sliding region. The adhesive lateral force component in the first term in formula (7) corresponds to the lateral force in the adhesive region and in formula (7), the adhesive lateral force component is calculated by representing a state in which a lateral displacement of the tread part caused by the effective slip angle $\alpha_e$ is reduced by the lateral bending deformation of the belt. The sliding lateral force component in the second term corresponds to the lateral force in the sliding region and in formula (7), the sliding lateral force component is calculated by expressing the shape of the contact pressure distribution p(t) generated by the effective slip angle $\alpha_e$ with the function "$D_{gsp}(t; n, q)$".

Also, in formula (8), the first term corresponds to integration within an integration range of zero to ($l_h$/i) and represents a torque component generated by the adhesive lateral force component that occurs in the adhesive region, and the second term corresponds to integration within an integration range of ($l_h$/l) to one and represents a torque component generated by the sliding lateral force component that occurs in the sliding region. Note that in formula (8), in addition to the above-mentioned two torque components, another torque component, that is, a third term is provided. The third term is a term proportional to ($l_h$/l)·tan $\alpha_e$ and represents a torque component about the tire center axis that is generated by the amount of the movement of the contact patch of the tire in the lateral direction due to the slip angle α and the longitudinal force that occurs to the tire. In other words, the torque $M_z'$ is calculated from a torque component generated by the adhesive lateral force, a torque component generated by the sliding lateral force, a torque component generated by the adhesive longitudinal force, and a torque component generated by the sliding longitudinal force.

As to the sliding friction coefficient $\mu_d$ in the sliding region, the same sliding friction coefficient is used in formula (6) for calculation of the longitudinal force and formula (7) for calculation of the lateral force. However, this coefficient may be dealt with as a parameter that is different between formula (6) and formula (7) so that the sliding friction coefficient can vary depending on a tread pattern of the tire.

Also, β used in formulae (6) to (8) indicates an angle in a sliding direction in the sliding region of the contact patch at the time of braking/driving and is determined by the slip angle and the slip ratio in the braking/driving direction. A frictional force acts with respect to the sliding direction. Therefore, in formula (6), a cos component of the longitudinal force with respect to the sliding direction contributes to the longitudinal force $F_x'$. Also, in formula (7), a sin component of the lateral force with respect to the sliding direction contributes to the lateral force $F_y'$. Further, in formula (8), a sin component of the lateral force contributes to d the torque $M_z'$. In other words, the longitudinal force $F_x'$, the lateral force $F_y'$, and the torque $M_z'$ are calculated using the angle β in this sliding direction.

Figure 5E:
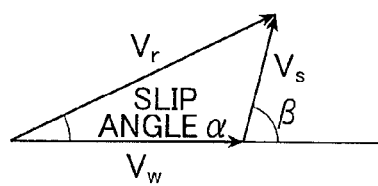

As to the sliding direction in the sliding region, sliding in the braking/driving direction and sliding due to the slip angle α occur at the same time, so there does not always occur sliding in a direction of the slip angle α and the braking/driving direction. More specifically, as shown in FIG. 5E, a difference between a direction of the traveling speed $V_r$ of the tire and a direction of the rotation speed $V_w$ of the tire is represented and the sliding speed $V_s$ and the angle β in the sliding direction are determined from the direction difference. The angle β in the sliding direction is defined in parentheses of formulae (6) to (8) and formulae (16) to (18). The reason why a definition of β in formulae (6) to (8) and that in formulae (16) to (18) (see FIG. 4) differ from each other is that a definition of the slip ratio S in the braking/driving direction at the time of braking and that at the time of driving differ from each other as will be described later.

In the case of driving, as shown in FIG. 4, similarly to the case of braking, values of the longitudinal force, the lateral force, and the torque calculated with formulae (11) to (18) of FIG. 4 (hereinafter referred to as the "longitudinal force $F_x'''$", the "lateral force $F_y'''$", and the "torque $M_z'''$") are obtained by setting the dynamic element parameters including the linear parameters and the nonlinear parameters and inputting of the slip angle α, the slip ratio S in the braking/driving direction, the rotation speed $V_w$, the longitudinal force $F_x$, the lateral force $F_y$, and the torque $M_z$. Needless to say, only when a difference between the inputted values of the longitudinal force $F_x$, the lateral force $F_y$, and the torque $M_z$ and the calculated values of the longitudinal force $F_x'$, the lateral force $F_y'$ and the torque $M_z'$ is equal to or smaller than a predetermined value, that is, the values of the longitudinal force $F_x$, the lateral force $F_y$, and the torque $M_z$ and the values of the longitudinal force $F_x'$, the lateral force $F_y'$, and the torque $M_z'$ approximately match with each other (converge and are under a force-balanced state in the tire dynamic model), the values of the longitudinal force $F_x'$, the lateral force $F_y'$, and the torque $M_z'$ are determined as values of the longitudinal force, the lateral force, and the torque of a tire that realize the force-balanced state.

Formulae (14) to (18) are respectively different from Formulae (4) to (8) of FIG. 3, which is resultant from the difference in the definition of the slip ratio. More specifically, the slip ratio S at the time of braking is defined by an expression $S=(V_r \cos α - V_w)/V_r \cos α$ ($V_r$ is the traveling speed of the tire, $V_w$ is the rotation speed of the tire, and α is the slip angle) and the slip ratio S at the time of driving is defined by a formula $S=(V_r \cos α - V_w)/V_w$. Therefore, when a longitudinal force that occurs to the tire is considered, a movement speed on a tire side represented in the formula of the slip ratio described above (denominator on the right side in the definition described above) differs, so formulae (14) to (18) are respectively different from formulae (4) to (8) of FIG. 3. Other expressions are the same as their corresponding expressions in FIG. 3. Therefore, a description of those expressions will be omitted.

Figure 8:
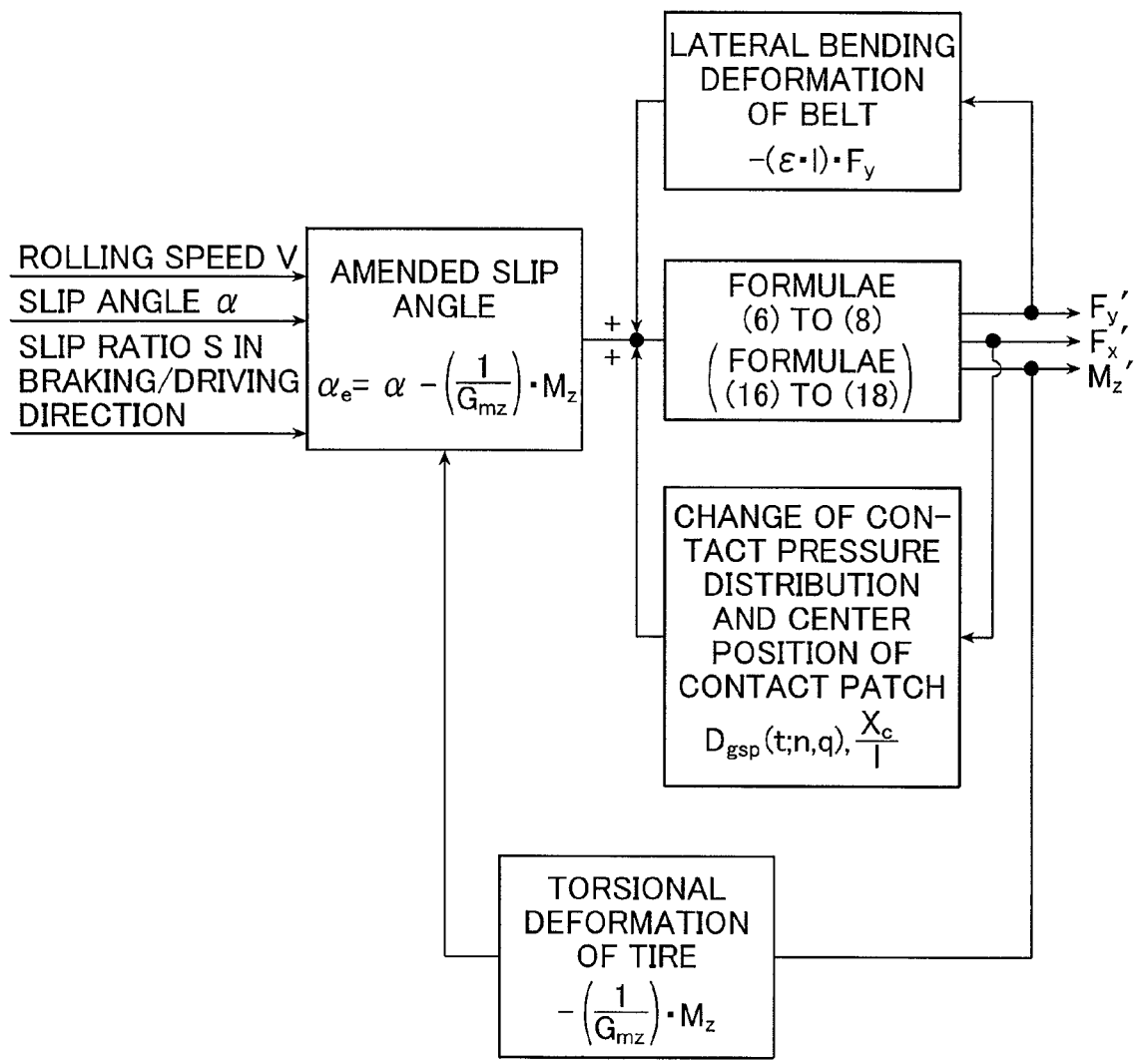
FIG. 8 is a processing block diagram of the calculation of a longitudinal force, a lateral force, and a torque in the tire dynamic model used in the methods according to the present invention.

FIG. 8 is a processing block diagram until the longitudinal force $F_x'$, the lateral force $F_y'$, and the torque $M_z'$ are calculated based on the tire dynamic model after the slip angle α and the slip ratio S in the braking/driving direction are given. As can be seen from FIG. 8, in the tire dynamic model according to the present invention, the lateral bending deformation of the belt, the contact pressure distribution, the change of the center position of the contact patch, and the torsional deformation of the tire are each fed back and the longitudinal force $F_x'$, the lateral force $F_y'$, and the torque $M_z'$ are calculated according to formulae (6) to (8) or formulae (16) to (18). Note that the given longitudinal force $F_x$ and lateral force $F_y$ are used for calculating the lateral bending deformation of the belt, the change of the contact pressure distribution, the change of the center position of the contact patch, and the torsional deformation of the tire that are used to calculate the longitudinal force $F_x'$, the lateral force $F_y'$, and the torque $M_z'$.

It should be noted that the longitudinal force $F_x'$, the lateral force $F_y'$, and the torque $M_z'$ calculated by the tire dynamic model computation program 14 do not necessarily match with the given longitudinal force $F_x$, lateral force $F_y$, and torque $M_z$. However, by sequence processing performed by the tire dynamic model program group 12 to be described later, the longitudinal force $F_x$, the lateral force $F_y$, and the torque $M_z$ are searched for so that the given longitudinal force $F_x$, lateral force $F_y$, and torque $M_z$ approximately match with the calculated longitudinal force $F_x'$, lateral force $F_y'$, and torque $M_z'$ (force-balanced state is realized). As a result, the longitudinal force, the lateral force, and the torque under the balanced state in the tire dynamic model are calculated.

Next, functions of the small slip angle condition parameter calculation program 20, the $F_x/F_y/M_z$ parameter calculation program 22, the small slip angle condition $F_x/F_y/M_z$ data calculation program 24, and the $F_x/F_y/M_z$ data calculation program 26 will be described.

The small slip angle condition parameter calculation program 20 is a program that derives the linear parameters and the nonlinear parameters described above when the characteristic curves of the longitudinal force $F_x$, the lateral force $F_y$, and the torque $M_z$ at the set slip angle of one degree set according to "Magic Formula" or obtained by using the amended value of the "Magic Formula" parameter are supplied. The values of the linear parameters and the values of the nonlinear parameters are derived so that a difference between the longitudinal force $F_x$, the lateral force $F_y$, and the torque $M_z$ and the longitudinal force $F_x'$, the lateral force $F_y'$, and the torque $M_z'$ calculated by the tire dynamic model computation program 14 becomes equal to or smaller than a predetermined value, that is, the longitudinal force, the lateral force, and the torque are placed under the force-balanced state in the tire dynamic model. The characteristic curves at the slip angle α of one degree are supplied for each of the applied loads and the slip ratios S in the braking/driving direction.

Figure 9:
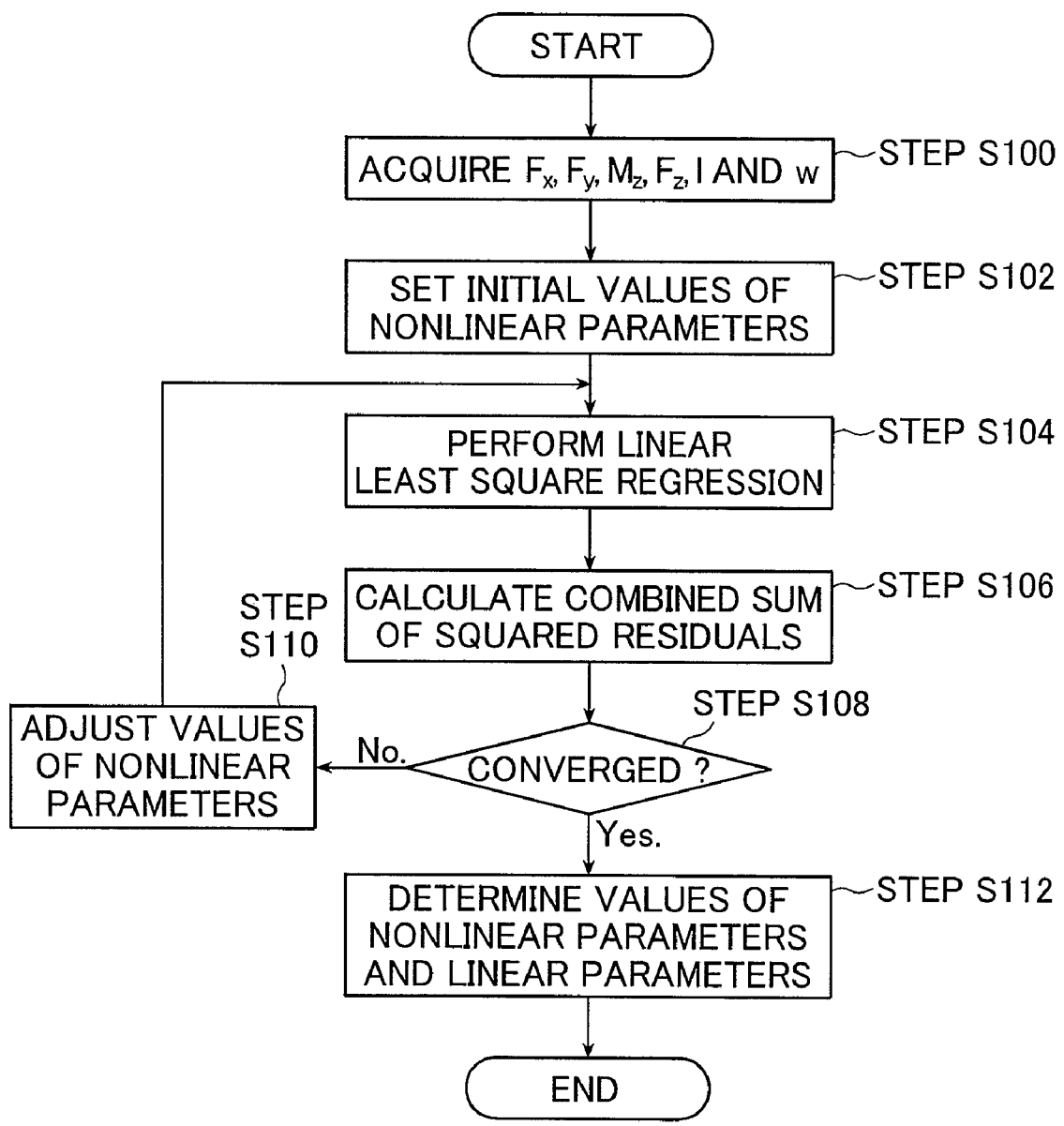
FIG. 9 is a flowchart showing a processing flow in the methods according to the present invention.

FIG. 9 shows a processing flow in the small slip angle condition parameter calculation program 20.

Specifically, first, data of the longitudinal force $F_x$, the lateral force $F_y$, and the torque $M_z$ on the characteristic curves at the slip angle α of one degree and data of the applied load $F_z$, and the contact length l and contact width w of the tire in a non-rolling state under the applied load $F_z$ are acquired in advance (Step S100). Those data is stored in the memory 4 and is called from the memory 4. Alternatively, the data is designated/inputted from the input operation system 5.

Then, the nonlinear parameters such as the lateral bending coefficient ε and the torsional compliance ($1/G_{mz}$) are initialized to predetermined values (Step S102).

Next, values of the linear parameters are calculated by using the initialized values of the lateral bending coefficient ε and the torsional compliance ($1/G_{mz}$) by linear square regression that is a known technique (Step S104).

Here, the nonlinear parameters are set to the predetermined values, so it is possible to determine normal equations for the linear parameters. By solving the normal equations, it is possible to uniquely calculate the values of the linear parameters.

More specifically, normal equations concerning the linear parameters are created from an expression of a sum of squared residuals using the set nonlinear parameters so that the longitudinal force $F_x'$, the lateral force $F_y'$, and the torque $M_z'$ calculated with formulae (6) to (8) optimally regress to the supplied longitudinal force $F_x$, lateral force $F_y$, and torque $M_z$. By solving the normal equations, values of linear parameters are calculated. Here, the normal equations are equations concerning the linear parameters and obtained by partially differentiating the expression, which determines the sum of squared residuals, by each of the linear parameters and giving zero to the values of the partial differential coefficients. The number of created normal equations is equal to the number of the linear parameters.

Next, the supplied data of the longitudinal force $F_x$, the lateral force $F_y$, and the torque $M_z$, the calculated linear parameters, and the initialized nonlinear parameters are given to the tire dynamic model computation program 14. The tire dynamic model computation program 14 receives the given data of the longitudinal force $F_x$, the lateral force $F_y$, and the torque $M_z$, values of the linear parameters, and values of the nonlinear parameters and calculates the longitudinal force $F_x'$, the lateral force $F_y'$, and the torque $M_z'$ at the slip angle $\alpha$ of one degree by following the flow in the processing block diagram shown in FIG. 8. In this case, the slip angle $\alpha$ is one degree, so the contact pressure distribution is fixed to have the coefficient n of the contact pressure distribution at the slip angle $\alpha$ of zero degree and, in addition, the bias coefficient q is set to zero. Further, the boundary position $(l_h/l)$ between the adhesive region and the sliding region is set to one. In other words, the contact patch does not include any sliding region and is the adhesive region in its entirety. Therefore, the sliding longitudinal force component and the sliding lateral force component and the torque component generated by the sliding lateral force component become zero in formulae (6) to (8). Also, the contact length l is given as measured data, so a function of the contact length obtained by regressing the measured contact length l with an exponential function of the applied load $F_z$, in other words, a function having applied load $F_z$ dependency is used.

Here, the contact width w is a width in the lateral direction of the tire tread part, which is provided with tire grooves forming a tread pattern. Therefore, an actual contact patch that is actually in contact with the road surface differs from a total contact patch of the tread part, so the contact width w corrected using a ratio of actual contact patch/total contact patch is used.

Next, the longitudinal force $F_x'$, the lateral force $F_y'$, and the torque $M_z'$ at the slip angle $\alpha$ of one degree calculated by the tire dynamic model computation program 14 are returned to the small slip angle condition parameter calculation program 20, and a combined sum of squared residuals $Q_c$ expressed by formula (19) below is calculated using the calculated data of the longitudinal force $F_x'$, the lateral force $F_y'$, and the torque $M_z'$ and the data of the longitudinal force $F_x$, the lateral force $F_y$, and the torque $M_z$ at the slip angle $\alpha$ of one degree (Step S106).

[Expression 1]

$$Q_c = g_x \cdot \sum_{i=1}^{N} (F_{xi} - F_{xi}')^2 + g_y \cdot \sum_{i=1}^{N} (F_{yi} - F_{yi}')^2 + g_m \cdot \sum_{i=1}^{N} (M_{zi} - M_{zi}')_2 \quad (19)$$

Here, N is a condition setting number for the applied loads and the slip ratios S in the braking/driving direction and i is an integer of 1 to N. Also, $g_x$, $g_y$, and $g_z$ are coefficients expressed by the following formulae when variances of the longitudinal force $F_x$, the lateral force $F_y$, and the torque $M_z$ under N conditions for the data of the longitudinal force $F_x$, the lateral force $F_y$, and the torque $M_z$ are referred to as $\sigma_x^2$, $\sigma_y^2$ and $\sigma_m^2$, and are weighting coefficients used to obtain the combined sum of squared residuals $Q_c$.

$g_x = 1/\sigma_x^2$
$g_y = 1/\sigma_y^2$
$g_m = 1/\sigma_m^2$

In other words, the combined sum of squared residuals $Q_c$ is obtained through weighted addition of respective sums of squared residuals of the longitudinal force, the lateral force, and the torque by using the reciprocals of the variances that are information on variations of the values on the characteristic curve as weighting coefficients.

As described above, the combined sum of squared residuals is calculated by adding results of multiplication of the sum of squared residuals of the value of the longitudinal force $F_x$ of the measured data and the value of the longitudinal force $F_x'$ of the calculated data by the weighting coefficient $g_x$, multiplication of the sum of squared residuals of the value of the lateral force $F_y$ of the measured data and the value of the lateral force $F_y'$ of the calculated data by the weighting coefficient $g_f$, and multiplication of the sum of squared residuals of the value of the torque $M_z$ of the measured data and the value of the torque $M_z'$ of the calculated data by the weighting coefficient $g_m$.

Here, the reason why the combined sum of squared residuals is used is that it is required to establish, in the calculation of the nonlinear parameters, optimal matching between the longitudinal force $F_x'$, the lateral force $F_y'$, and the torque $M_z'$ under multiple conditions and the corresponding longitudinal force $F_x$, lateral force $F_y$, and torque $M_z$.

Further, it is judged whether the combined sum of squared residuals converges to be a predetermined value or smaller than the predetermined value (Step S108).

When it is not judged that the combined sum of squared residuals converges, values of previously set nonlinear parameters are adjusted (Step S110). Those values of the nonlinear parameters are adjusted in accordance with, for instance, a Newton-Raphson method. More specifically, an equation associating a matrix and the amount of the adjustment of the nonlinear parameters with each other is obtained by subjecting the combined sum of squared residuals to second order partial differential with respect to the nonlinear parameters, and the amount of the adjustment of the values of the nonlinear parameters is calculated by solving this equation for the above-mentioned adjustment amount. This calculation method is described in detail in Japanese Patent Application No. 2001-242059 (JP 2003-57134 A) filed by the applicant of the present invention.

Each time those values of the nonlinear parameters are adjusted, the linear least square regression (Step S104) concerning the linear parameters and the calculation of the combined sum of squared residuals (Step S106) are performed, thereby obtaining the combined sum of squared residuals according to formula (19). Then, the values of the nonlinear parameters are repeatedly adjusted until the combined sum of squared residuals becomes the predetermined value or smaller than the predetermined value.

When the combined sum of squared residuals becomes the predetermined value or smaller, the values of the linear parameters calculated through the linear least square regression and the values of the nonlinear parameters are determined as parameters (Step S112). The values of the parameters are determined for each condition supplied. The determined values of the parameters are stored in the memory 20. Alternatively, the values of the parameters are output to the output device 7.

The flow of the calculation by the small slip angle condition parameter calculation program 20 of the linear parameters and the nonlinear parameters at the slip angle α of one degree using the tire dynamic model has been described above.

Next, the $F_x/F_y/M_z$ parameter calculation program 22 will be described.

Figure 10:
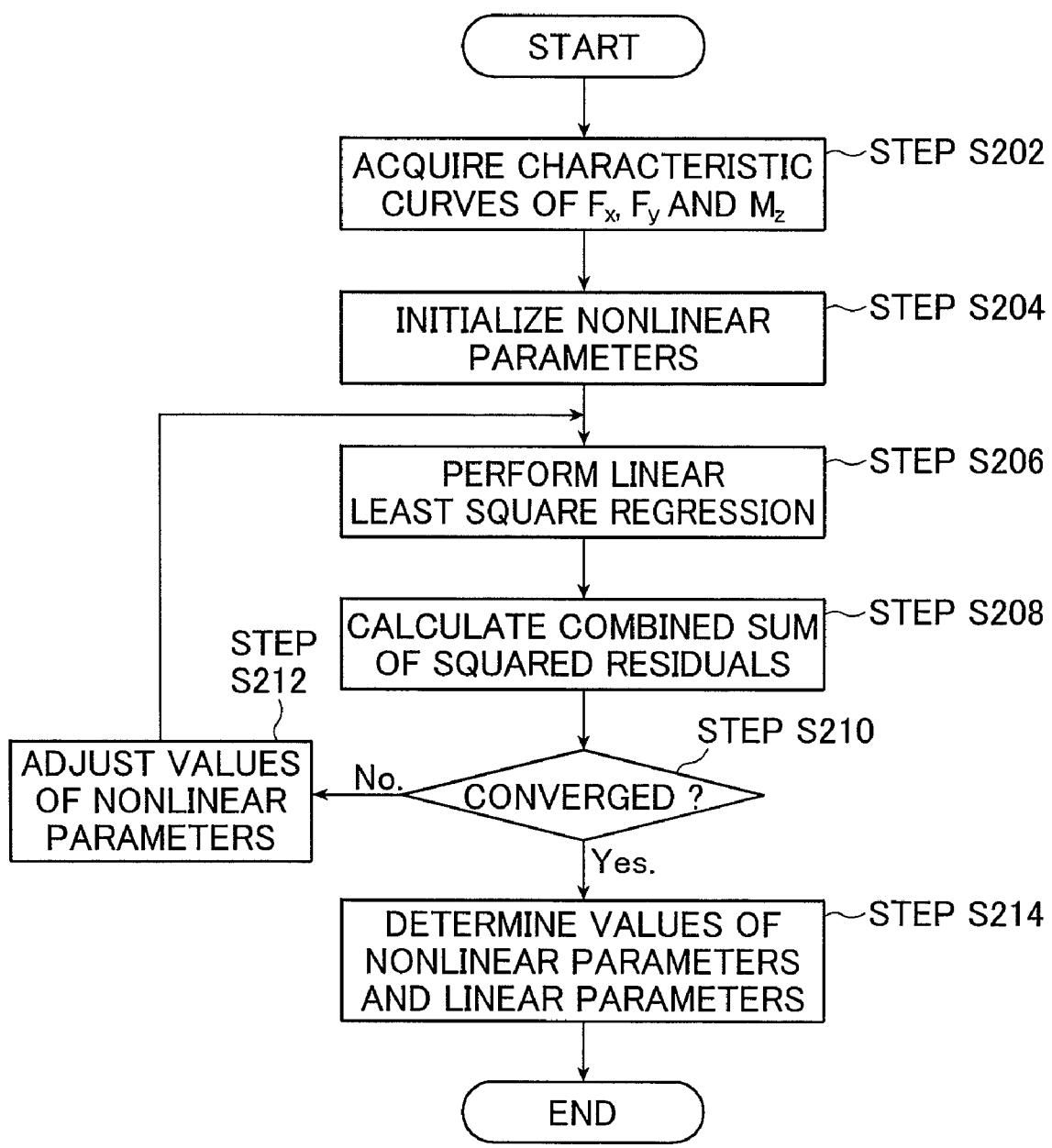
FIG. 10 is a flowchart showing another processing flow in the methods according to the present invention.

FIG. 10 shows a processing flow in the $F_x/F_y/M_z$ parameter calculation program 22.

As shown in FIG. 10, first, the $F_x/F_y/M_z$ parameter calculation program 22 receives supply of the characteristic curves of the longitudinal force $F_x$, the lateral force $F_y$, and the torque $M_z$ at the time when the slip angle is changed from 0 to 20 degrees under multiple conditions in which the slip ratio in the braking/driving direction is changed in various manners under a constant applied load (Step S202). Alternatively, the $F_x/F_y/M_z$ parameter calculation program 22 receives supply of the characteristic curves of the longitudinal force $F_x$, the lateral force $F_y$, and the torque $M_z$ at the time when the slip ratio in the braking/driving direction is changed within a range of −1 to 1 under multiple conditions in which the slip angle is changed in various manners under a constant applied load.

Next, the lateral bending coefficient ε, the torsional compliance ($1/G_{mz}$), the coefficient n, and the like that are the nonlinear parameters are initialized to predetermined values (Step S204).

Next, linear least square regression is performed using the characteristic curves of the longitudinal force $F_x$, the lateral force $F_y$, and the torque $M_z$ and the initialized nonlinear parameters (Step S206). More specifically, normal equations concerning the linear parameters, such as the sliding friction coefficient $\mu_{d0}$ and the coefficient $b_v$, at a sliding speed of zero is created and the values of the linear parameters are calculated by solving the normal equations. In other words, the linear least square regression is performed. Here, as described above, the normal equations are equations that concern the linear parameters and is obtained by partially differentiating the sum of squared residuals by the respective linear parameters described above and giving zero to the partial differential coefficients, with the number of created normal equations being equal to the number of the linear parameters.

The thus initialized values of the nonlinear parameters, the values of the linear parameters which are calculated by using the normal equations, and the data of the characteristic curves of the longitudinal force $F_x$, the lateral force $F_y$, and the torque $M_z$ are given to the tire dynamic model computation program 14. As a result, the longitudinal force $F_x'$, the lateral force $F_y'$, and the torque $M_z'$ that are corresponding calculated data are calculated in accordance with the flow of the block diagram shown in FIG. 8.

Next, by using the calculated data of the longitudinal force $F_x'$, the lateral force $F_y'$, and the torque $M_z'$ and the data of the characteristic curves of the longitudinal force $F_x$, the lateral force $F_y$, and the torque $M_z$ at the given slip angle α, the combined sum of squared residuals $Q_c$ expressed by formula (19) above is calculated (Step S208). In this case, N in formula (19) is the number of set conditions for the given slip ratio S in the braking/driving direction and slip angle α. Also, the weighting coefficients $g_x$, $g_y$, and $g_m$ are obtained from the variances of the longitudinal force $F_x$, the lateral force $F_y$, and the torque $M_z$ under the N conditions for the slip angle and the slip ratio in the braking/driving direction.

Also, $g_x$, $g_y$, and $g_m$ are coefficients expressed by the following formulae when the variances of the longitudinal force $F_x$, the lateral force $F_y$, and the torque $M_z$ under the N conditions for the data of the longitudinal force $F_x$, the lateral force $F_y$, and the torque $M_z$ is referred to as $\sigma_x^2$, $\sigma_y^2$, and $\sigma_m^2$, and are weighting coefficients used to obtain the combined sum of squared residuals $Q_c$.

$g_x = 1/\sigma_x^2$
$g_y = 1/\sigma_y^2$
$g_m = 1/\sigma_m^2$

In other words, the combined sum of squared residuals $Q_c$ is obtained through weighted addition of respective sums of squared residuals of the longitudinal force, the lateral force, and the torque by using the reciprocals of the variances that are information on variations of the values on the characteristic curves as weighting coefficients.

As described above, the combined sum of squared residuals is calculated by adding results of multiplication of the sum of squared residuals of the value on the characteristic curve of the longitudinal force $F_x$ and the value of the longitudinal force $F_x'$ calculated by the tire dynamic model computation program 14 by the weighting coefficient $g_x$, multiplication of the sum of squared residuals of the value on the characteristic curve of the lateral force $F_y$ and the value of the lateral force $F_y'$ calculated by the tire dynamic model computation program 14 by the weighting coefficient $g_y$, and multiplication of the sum of squared residuals of the value on the characteristic curve of the torque $M_z$ and the value of the torque $M_z'$ calculated by the tire dynamic model computation program 14 by the weighting coefficient $g_m$. Here, the reason why the combined sum of squared residuals is used is that similarly to the case described above, it is required to establish, in the calculation of the nonlinear parameters, simultaneous matching between the longitudinal force $F_x'$, the lateral force $F_y'$, and the torque $M_z'$ under the multiple conditions for the slip angle and the slip ratio in the braking/driving direction and the corresponding longitudinal force $F_x$, lateral force $F_y$, and torque $M_z$.

It is judged whether the combined sum of squared residuals converges to be a predetermined value or smaller than the predetermined value (Step S210).

When it is not judged that the combined sum of squared residuals converges, the nonlinear parameters initialized in Step S204 are adjusted (Step S212). The nonlinear parameters are adjusted in accordance with, for instance, a Newton-Raphson method.

Those nonlinear parameters are repeatedly adjusted until it is judged in Step S210 that the combined sum of squared residuals converges. The linear least square regression concerning the linear parameters (Step S206) and the calculation of the combined sum of squared residuals (Step S208) are performed each time this adjustment is performed, thereby obtaining the combined sum of squared residuals according to formula (19) above. Then, until the combined sum of squared residuals becomes the predetermined value or smaller, the nonlinear parameters are adjusted. When the combined sum of squared residuals becomes the predetermined value or smaller, the value of each nonlinear parameter calculated by using the linear least square regression is determined (Step S214) and the values of the dynamic element parameters are stored in the memory 4. Alternatively, the values of the parameters are output to the output device 7.

It should be noted that in the initialization of the values of the nonlinear parameters in Step S202 shown in FIG. 10, the values of the nonlinear parameters obtained as a result of the processing shown in FIG. 9 may be set as initial values or initial values may be originally set as parameters whose values are not yet determined. When the values of the nonlinear parameters are already calculated and known in the processing shown in FIG. 9, however, it is preferable that those calculated values be used. This is because it is required to establish matching between the values of the dynamic element parameters obtained by the small slip angle condition parameter calculation program 20 and the values of the dynamic element parameters obtained by the $F_x/F_y/M_z$ parameter calculation program 22.

The flow of the calculation by the $F_x/F_y/M_z$ parameter calculation program 22 of the values of the linear parameters and the nonlinear parameters using the tire dynamic model has been described above.

The small slip angle condition $F_x/F_y/M_z$ data calculation program 24 is a portion that calculates the data of the longitudinal force $F_x'$, the lateral force $F_y'$ and the torque $M_z'$ by fixing the slip angle α to one degree, fixing the slip ratio S in the braking/driving direction to a constant value, and changing the applied load. The small slip angle condition $F_x/F_y/M_z$ data calculation program 24 is also capable of calculating the data of the longitudinal force $F_x'$, the lateral force $F_y'$ and the torque $M_z'$ by fixing the slip angle α to one degree, fixing the applied load to a constant value, and changing the slip ratio S in the braking/driving direction.

Figure 11:
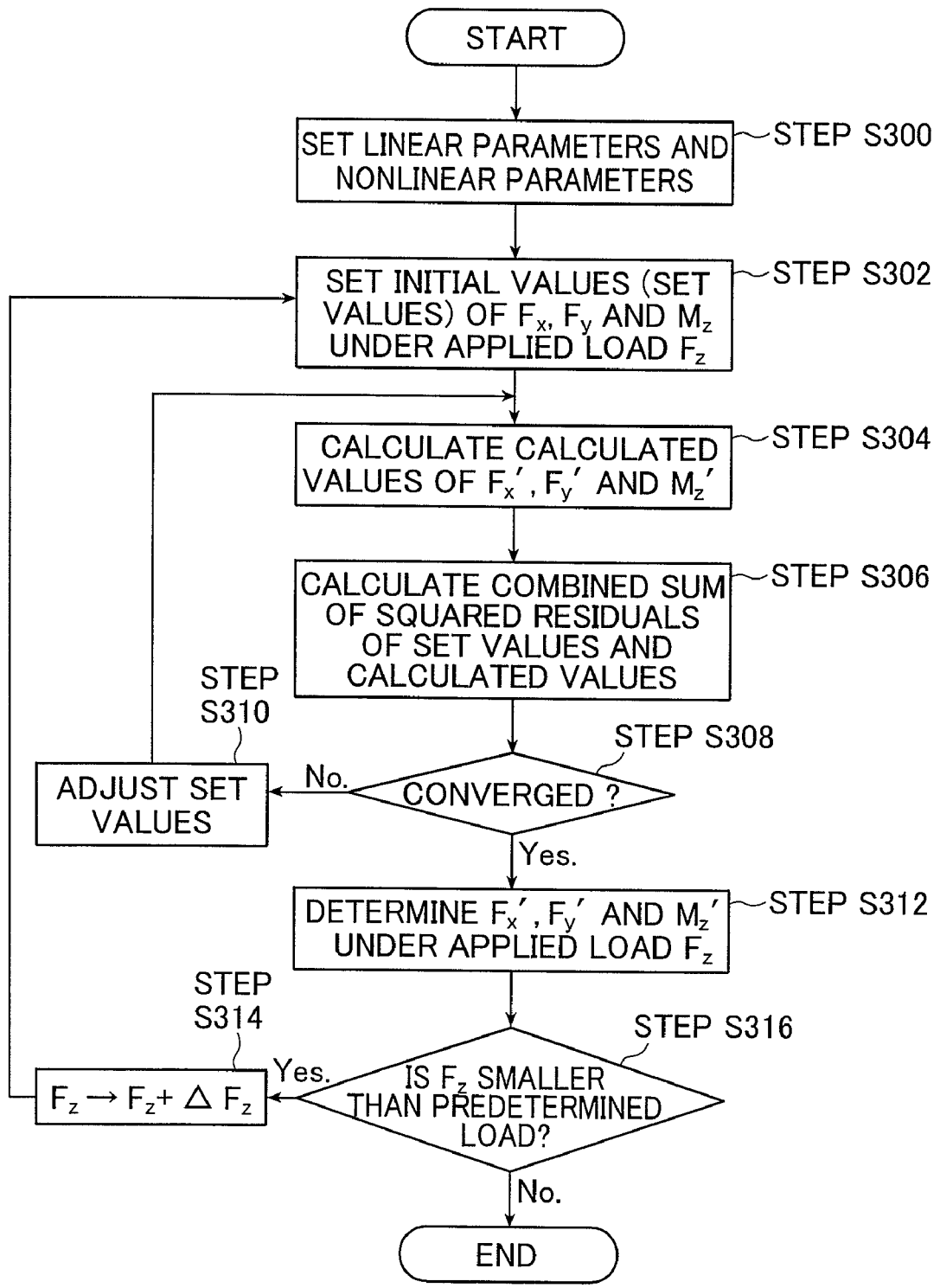
FIG. 11 is a flowchart showing another processing flow in the methods according to the present invention.

FIG. 11 shows a processing flow at the time when the small slip angle condition $F_x/F_y/M_z$ data calculation program 24 calculates the data of the longitudinal force $F_x'$, the lateral force $F_y'$, and the torque $M_z'$ by changing the applied load.

Specifically, first, as shown in FIG. 11, the small slip angle condition $F_x/F_y/M_z$ data calculation program 24 reads the values of the linear parameters and the nonlinear parameters calculated by the small slip angle condition parameter calculation program 20 from the memory 4 and sets the read values (Step S300). The values of the parameters are set for each applied load.

Then, the longitudinal force $F_x$, the lateral force $F_y$, and the torque $M_z$ under the applied load $F_z$ are initialized (Step S302).

After that, the linear parameters and the nonlinear parameters are given to the tire dynamic model computation program 14 together with the slip angle α of one degree and the initialized longitudinal force $F_x$, lateral force $F_y$, and torque $M_z$. The tire dynamic model computation program 14 calculates the longitudinal force $F_x'$, the lateral force $F_y'$, and the torque $M_z'$ in accordance with formulae (6) to (8) in FIG. 3 or formulae (16) to (18) in FIG. 4 using the given linear parameters and nonlinear parameters and the initialized longitudinal force $F_x$, lateral force $F_y$, and torque $M_z$ (Step S304).

In this case, the slip angle α is one degree, so the coefficient n of the contact pressure distribution is fixed to the coefficient n at the slip angle α of zero degree and the bias coefficient q is set to zero. Also, when the contact length l is given, this contact length l is used as a preset value.

The thus calculated longitudinal force $F_x'$, lateral force $F_y'$, and torque $M_z'$ at the slip angle of one degree are returned to the small slip angle condition $F_x/F_y/M_z$ data calculation program 24. The small slip angle condition $F_x/F_y/M_z$ data calculation program 24 calculates the combined sum of squared residuals of the set values of the longitudinal force $F_x$, the lateral force $F_y$, and the torque $M_z$ given to the tire dynamic model computation program 14 and the calculated values of the longitudinal force $F_x'$, lateral force $F_y'$, and torque $M_z'$ in accordance with formula (19) (Step S306).

Next, it is judged whether the combined sum of squared residuals converges to be a predetermined value or smaller than the predetermined value (Step S308).

When it is not judged that the combined sum of squared residuals converges, the previously set values of the longitudinal force $F_x$, lateral force $F_y$, and torque $M_z$ are adjusted (Step S310). The adjusted longitudinal force $F_x$, lateral force $F_y$, and torque $M_z$ are given again to the tire dynamic model computation program 14 together with the linear parameters and the nonlinear parameters.

Then, the set values of the longitudinal force $F_x$, the lateral force $F_y$, and the torque $M_z$ are adjusted until the combined sum of squared residuals converges to be the predetermined value or smaller. The set values are adjusted in accordance with, for instance, the above-mentioned Newton-Raphson method. In this manner, the converging longitudinal force $F_x'$, lateral force $F_y'$, and torque $M_z'$ are determined (Step S312).

Further, the condition for the applied load $F_z$ is changed (Step S314). Each time the applied load $F_z$ is changed, the longitudinal force $F_x$, the lateral force $F_y$, and the torque $M_z$ are initialized and set (Step S302). Then, the longitudinal force $F_x'$, the lateral force $F_y'$, and the torque $M_z'$ are calculated by using those set values (Step S304), the combined sum of squared residuals is calculated (Step S306), and it is judged whether the combined sum of squared residuals converges (Step S308).

Then, the applied load $F_z$ is successively changed in a certain direction and is repeatedly changed until the applied load $F_z$ becomes a predetermined load (Step S316). Each time the applied load $F_z$ is changed, the longitudinal force $F_x'$, the lateral force $F_y'$, and the torque $M_z'$ are calculated and the converged longitudinal force $F_x'$, lateral force $F_y'$, and torque $M_z'$ are determined. The determined longitudinal force $F_x'$, lateral force $F_y'$, and torque $M_z'$ are stored in the memory 20.

In this manner, a curve at the slip angle α of one degree depending on the applied load $F_z$ is obtained by setting the slip ratio S in the braking/driving direction to a constant value. Needless to say, it is also possible to obtain a curve at the slip angle α of one degree depending on the slip ratio S in the braking/driving direction by setting the applied load $F_z$ to a constant value.

The flow of the processing performed by the small slip angle condition $F_x/F_y/M_z$ data calculation program 24 using the tire dynamic model has been described above.

The $F_x/F_y/M_z$ data calculation program 26 is a portion that calculates data of the longitudinal force, the lateral force, and the torque by fixing one of the slip ratio in the braking/driving direction and the slip angle to a constant value by using the linear parameters and the nonlinear parameters that are the tire dynamic element parameters for the tire dynamic model described above under a predetermined applied load. For instance, the $F_x/F_y/M_z$ data calculation program 26 obtains characteristic curves at the time when the slip ratio S in the braking/driving direction is set to a constant value and the slip angle α is changed from 0 to 20 degrees, characteristic curves at the time when the slip angle α is set to a constant value and the slip ratio S in the braking/driving direction is changed within a range of −1 to 1, and a friction ellipse at the time when the slip ratio S in the braking/driving direction and the slip angle α are changed without any constraint, the friction ellipses being represented with a vertical axis set for the lateral force and with a horizontal axis set for the longitudinal force.

Figure 12:
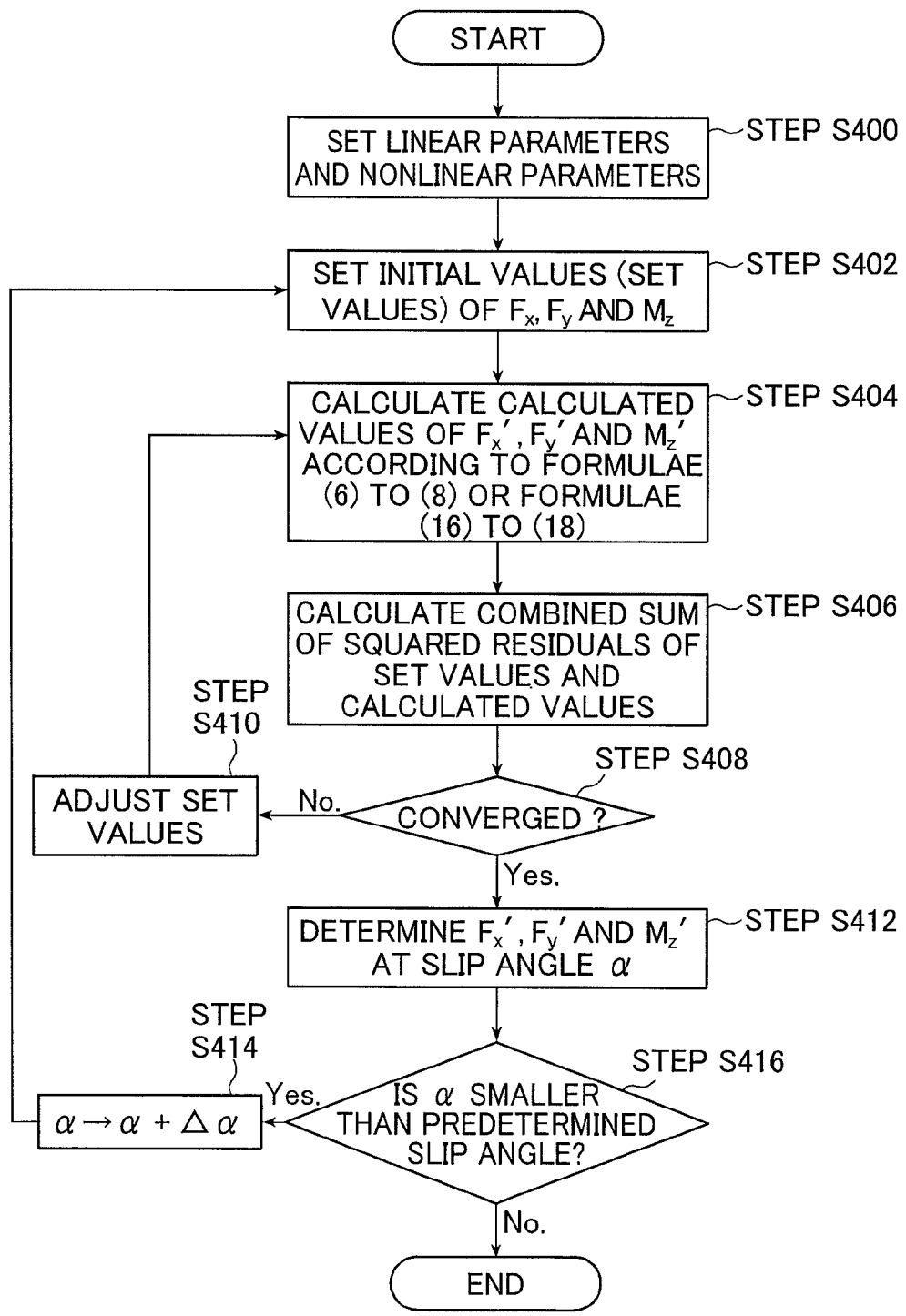
FIG. 12 is a flowchart showing another processing flow in the methods according to the present invention.

FIG. 12 shows an example of a processing flow in the $F_x/F_y/M_z$ data calculation program 26. In this example, the characteristic curves expressing dependency of the longitudinal force, the lateral force, and the torque on the slip angle α are calculated by fixing the slip ratio S in the braking/driving direction and the applied load to constant values.

The $F_x/F_y/M_z$ data calculation program 26 first reads derived values of the linear parameters and the nonlinear parameters from the memory 4 and sets the read values (Step S400).

Further, the $F_x/F_y/M_z$ data calculation program 26 initializes the longitudinal force $F_x$, the lateral force $F_y$, and the torque $M_z$ under the applied load $F_z$ (Step S402).

After that, when calculating characteristic curves expressing slip angle dependency, the $F_x/F_y/M_z$ data calculation program 26 gives the linear parameters, the nonlinear parameters, and the initialized longitudinal force $F_x$, lateral force $F_y$, and torque $M_z$ to the tire dynamic model computation program 14 together with the set slip angle $\alpha=\Delta\alpha$. The tire dynamic model computation program 14 calculates the longitudinal force $F_x{'}$, the lateral force $F_y{'}$, and the torque $M_z{'}$ in accordance with formulae (6) to (8) or formulae (16) to (18) by using the given linear parameters and nonlinear parameters and the initialized longitudinal force $F_x$, lateral force $F_y$, and torque $M_z$ (Step S404).

The thus calculated longitudinal force $F_x{'}$, lateral force $F_y{'}$, and torque $M_z{'}$ are returned to the $F_x/F_y/M_z$ data calculation program 26. The $F_x/F_y/M_z$ data calculation program 26 calculates the combined sum of squared residuals of the set values of the longitudinal force $F_x$, the lateral force $F_y$, and the torque $M_z$ given to the tire dynamic model computation program 14 and the calculated values of the calculated longitudinal force $F_x{'}$, lateral force $F_y{'}$, and torque $M_z{'}$ in accordance with Expression (19) (Step S406).

Next, it is judged whether the calculated combined sum of squared residuals converges to be a predetermined value or smaller than the predetermined value (Step S408).

When it is not judged that the combined sum of squared residuals converges, the previously set values of the longitudinal force $F_x$, lateral force $F_y$, and torque $M_z$ are adjusted (Step S410). The adjusted longitudinal force $F_x$, lateral force $F_y$, and torque $M_z$, the linear parameters, and the nonlinear parameters are given again to the tire dynamic model computation program 14.

Then, the set values of the longitudinal force $F_x$, the lateral force $F_y$, and the torque $M_z$ are adjusted until the combined sum of squared residuals converges to be the predetermined value or smaller. Those set values are adjusted in accordance with, for instance, the above-mentioned Newton-Raphson method. In this manner, the longitudinal force $F_x{'}$, the lateral force $F_y{'}$, and the torque $M_z{'}$ are determined (Step S412).

Next, it is judged whether the slip angle α is smaller than a predetermined slip angle (Step S416).

When it is judged that the slip angle α is smaller than the predetermined slip angle, a condition for the slip angle α is changed ($\alpha \rightarrow \alpha + \Delta\alpha$) (Step S414). Then, the initial values of the longitudinal force $F_x$, the lateral force $F_y$, and the torque $M_z$ at the changed slip angle α are set (Step S402), the longitudinal force $F_x{'}$, the lateral force $F_y{'}$, and the torque $M_z{'}$ are calculated (Step S404), the combined sum of squared residuals is calculated (Step S406), and it is judged whether this combined sum of squared residuals converges (Step S408).

Then, the slip angle α is repeatedly changed until the slip angle α becomes the predetermined slip angle (Step S416). Each time this slip angle is changed, the longitudinal force $F_x{'}$, the lateral force $F_y{'}$, and the torque $M_z{'}$ are calculated so as to determine the converged longitudinal force $F_x{'}$, lateral force $F_y{'}$, and torque $M_z{'}$. Data of the determined longitudinal force $F_x{'}$, lateral force $F_y{'}$, and torque $M_z{'}$ are stored in the memory 4. Alternatively, the data is output to the output device 7.

In this manner, the characteristic curves of the longitudinal force, the lateral force, and the torque depending on the slip angle α are obtained. In the above example, the slip angle α is changed under a condition in which the slip ratio S in the braking/driving direction is set to a constant value, but after this, characteristic curves of dependency of the longitudinal force, the lateral force, and the torque on the slip angle α may be further obtained by changing the slip ratio S in the braking/driving direction. Aside from this, it is also possible to change the slip ratio S in the braking/driving direction under a condition in which the slip angle α is set to a constant value. In this case, the slip ratio S in the braking/driving direction is repeatedly changed until the slip ratio S becomes a predetermined value.

Figure 13:
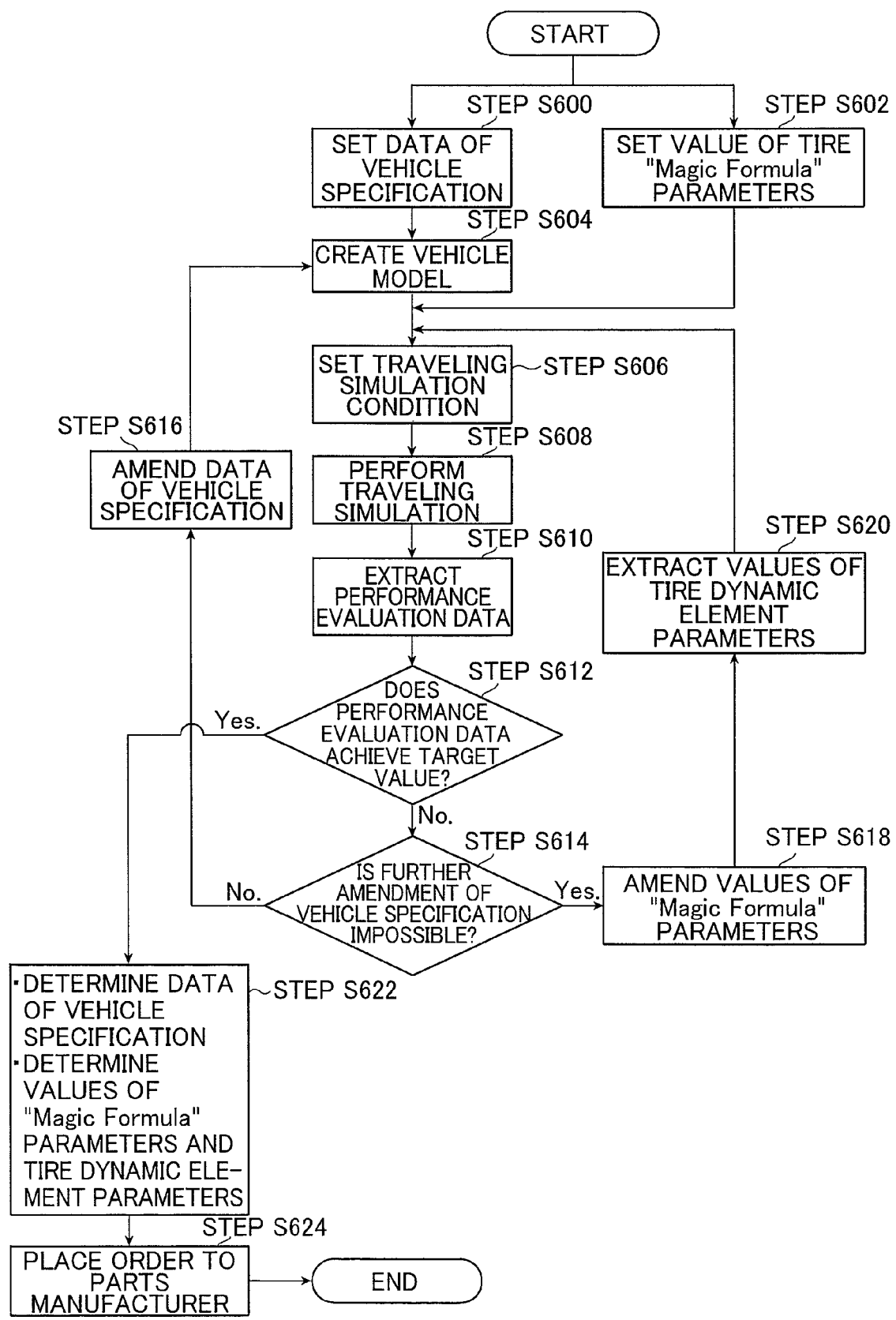
FIG. 13 is a flowchart showing a flow in an example of the methods according to the present invention.

Next, an example of the vehicle designing method according to the present invention will be described. FIG. 13 shows a flow of vehicle designing performed using the apparatus 1 described above.

First, the setting program 9 sets the data of the vehicle specification and the values of the tire "Magic Formula" parameters (Steps S600 and S602). Those settings may be made by calling predetermined data from the memory 4 or through designation/input by the input operation system 5. For the "Magic Formula" parameters, values of the standard tire are set, for instance.

Next, the vehicle traveling simulation program 10 creates a vehicle model based on the set data of the vehicle specification. For instance, a vehicle model is created according to an analysis model for mechanism (Step S604). In addition, a traveling simulation condition is set (Step S606). Different traveling simulation conditions are set in accordance with performance to be evaluated. For instance, in the case where a performance evaluation is a durability evaluation, a vehicle traveling speed, profile data of roughness and the like of a road surface are set as a traveling condition. In the case of an emergency avoidance performance evaluation, data of a traveling speed including vehicle braking/driving, a steering angle, profile data of an actual road surface, and the like are set as a traveling condition.

In addition, a traveling simulation is performed using the set values of the "Magic Formula" parameters and the vehicle model under the traveling simulation condition (Step S608). A result of the traveling simulation is stored in the memory 4.

Next, the integration/management program 13 calls the traveling simulation result from the memory 4, calculates performance evaluation data for a set performance evaluation measure (Step S610), and judges whether this performance evaluation data satisfies a target value set in advance (Step S612). When the performance evaluation data does not satisfy the target value, it is judged whether an amendment of the data of the vehicle specification is possible (Step S614) and when a result of this judgment is affirmative, the data of the vehicle specification is amended (Step S616). The amended vehicle specification data is sent again to the vehicle traveling simulation program 10. Then, the vehicle model is created again, the values of the "Magic Formula" parameters are given to the vehicle model, and a vehicle traveling simulation is performed.

In this manner, the vehicle specification data is repeatedly amended until the performance evaluation data satisfies the target value and the performance evaluation is repeated each time the vehicle specification data is amended.

It should be noted that when the performance evaluation data does not satisfy the target value and a further amendment of the vehicle specification data is impossible (vehicle wheel base exceeds a regulated length, for instance), the values of the "Magic Formula" parameters are amended instead of the vehicle specification data (Step S618). A method of amending the parameter values is not specifically limited and the parameter values are successively changed by a predetermined quantity, for instance. Each parameter has a value for each of the slip ratio S in the braking/driving direction and the applied load, for instance. Therefore, those parameter values are amended.

As described above, the amendment of the tire characteristic is performed after the amendment of the vehicle specification data and a traveling simulation and a vehicle performance evaluation are done at least once, so it becomes possible to efficiently achieve a part of target performance, which is unachievable with the vehicle specification, with the tire characteristic, to thereby make it possible to efficiently perform vehicle designing including tire designing.

Next, values of dynamic element parameters for the tire dynamic model are derived using the amended values of the "Magic Formula" parameters (Step S620). More specifically, the "Magic Formula" data/parameter calculation program 11 calculates characteristic curves expressing dependency of the longitudinal force, the lateral force, and the torque on the slip angle and stores those characteristic curves in the memory 4, for instance. The values of the "Magic Formula" parameters are set for each of multiple load conditions and the slip ratio in the braking/driving direction, so the characteristic curves expressing the slip angle dependency are created for each of the slip ratio S in the braking/driving direction and the applied load conditions. Next, the small slip angle condition parameter calculation program 20 derives the values of the dynamic element parameters for the tire dynamic model and the $F_x/F_y/M_z$ parameter calculation program 22 derives the values of the remaining dynamic element parameters for the tire dynamic model (Step S620). The derived values of the dynamic element parameters are stored in the memory 4 as dynamic element parameters corresponding to the amended "Magic Formula" parameter.

It should be noted that in the derivation of the values of the dynamic element parameters, depending on a degree of convergence (Step S210 in FIG. 10), there is also a case where the characteristic curves expressed by the values of the "Magic Formula" parameters and the characteristic curves expressed by the dynamic element parameters do not completely match with each other. In this case, it is preferable that after Step S620, the $F_x/F_y/M_z$ data calculation program 26 calculate the characteristic curves of the dependency of the longitudinal force, the lateral force, and the torque expressed by the dynamic element parameters on the slip angle and supply those calculated characteristic curves to the "Magic Formula" data/parameter calculation program 11, then to derive the values of the "Magic Formula" parameters. This is because it is guaranteed that the derived values of the "Magic Formula" parameters are extremely close to the values of the "Magic Formula" parameters amended in Step S618 and the parameter is realizable in the tire dynamic model.

Next, a traveling simulation is performed by giving the amended values of the "Magic Formula" parameters to the vehicle model. Then, until an affirmative result of the judgment in Step S612 is obtained, the values of the "Magic Formula" parameters are repeatedly amended and a traveling simulation using the vehicle model and a performance evaluation are performed each time the values of the "Magic Formula" parameters are amended.

When an affirmative result of the judgment in Step S612 is obtained, the data of the vehicle specification is determined and further the values of the "Magic Formula" parameters and the values of the tire dynamic element parameters are determined as a tire requisite characteristic (Step S622).

Based on the thus determined data of the vehicle specification, detailed designing of a construction component such as a suspension, is performed and, in addition, the determined tire dynamic element parameters are presented as the tire requisite characteristic and a tire order is placed to a tire manufacturer (Step S624).

As described above, the tire requisite characteristic is realizable with the tire dynamic model, so it is possible to say that the tire requisite characteristic is realizable in tire structure designing and material designing. Accordingly, it becomes possible to place an order for tires, which are in conformity with the determined data of the vehicle specification and is realizable, to the tire manufacturer. Also, it becomes possible to determine the tire characteristic without using a complicated tire dynamic model, so through a combination use of a database of tire rubber part material characteristics, it becomes possible even for a person in charge of vehicle designing to judge whether the tire requisite characteristic is appropriate. Therefore, the present invention contributes to shortening of a period of vehicle designing. Also, the requisite characteristic is presented using the tire dynamic element parameters, which enables smooth development collaboration between a vehicle designer and a tire designer and dramatically improves development efficiency. In particular, it becomes possible to evaluate vehicle performance from a stage without any prototype of tire, which makes it possible to make a performance evaluation such as an emergency avoidance performance evaluation from an early stage, which enables achievement of an improvement of the vehicle performance in a short time.

Figure 14:
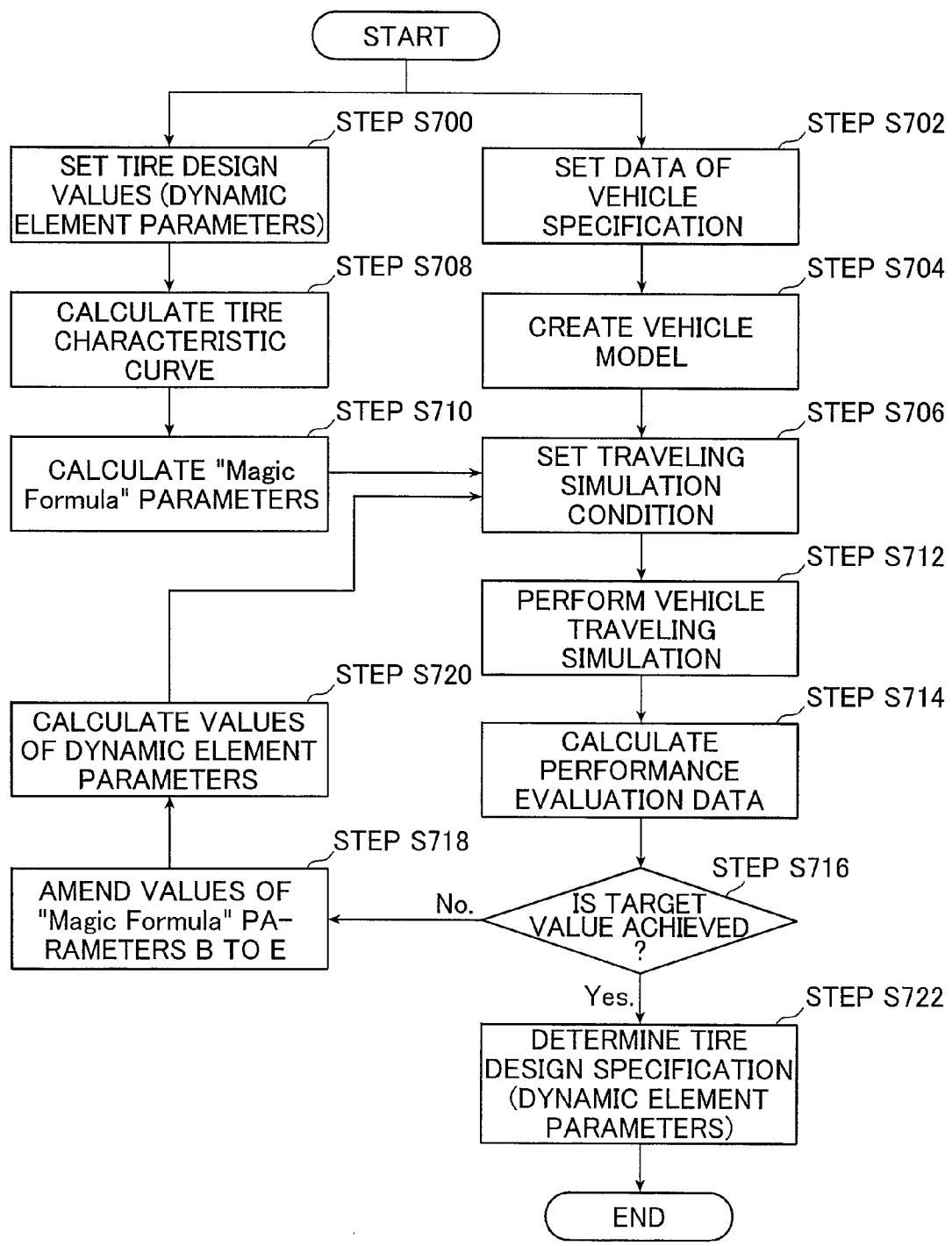
FIG. 14 is a flowchart showing a flow in an example of the methods according to the present invention.

Next, the tire designing method according to the present invention will be described. FIG. 14 shows a flow of the tire designing method performed using the apparatus 1 described above.

First, the setting program 9 sets the data of the vehicle specification and tire design values (values of the dynamic element parameters) (Steps S700 and S702). Those settings may be made by calling predetermined data from the memory 4 or through designation/input by the input operation system 5.

Next, the vehicle traveling simulation program 10 creates a vehicle model based on the set data of the vehicle specification. For instance, a vehicle model is created according to an analysis model for mechanism (Step S704). Further, a traveling simulation condition is set (Step S706). Different traveling simulation conditions are set in accordance with performance to be evaluated. For instance, when a performance evaluation is a durability evaluation, a vehicle traveling speed, profile data of roughness and the like of a road surface are set as the traveling condition. In a case of an emergency avoidance performance evaluation, data of a vehicle traveling speed, a steering angle, profile data of an actual road surface, and the like are set as the traveling condition.

On the other hand, based on the dynamic element parameters set in Step S700, the $F_x/F_y/M_z$ data calculation program 26 calculates the characteristic curves of the longitudinal force, the lateral force, and the torque that are tire dynamic characteristics (Step S708).

Next, the "Magic Formula" data/parameter calculation program 11 calculates the values of the "Magic Formula" parameters using the calculated characteristic curves (Step S710). Note that the dynamic element parameters are set under multiple load conditions and multiple conditions for the slip ratio in the braking/driving direction, so the characteristic curves are calculated for each condition. Therefore, the values of the "Magic Formula" parameters are also calculated for each condition. Such parameter values are used in a vehicle traveling simulation together with the traveling simulation condition.

Next, a vehicle traveling simulation is performed using the vehicle model created in Step S704 while calculating the longitudinal force, the lateral force, and the torque from the set values of the "Magic Formula" parameters under the traveling simulation condition (Step S712).

A result of the traveling simulation is stored in the memory 4.

Next, the integration/management program 13 calls the result of the traveling simulation from the memory 4, calculates performance evaluation data for a set performance evaluation measure (Step S714), and judges whether this performance evaluation data satisfies a target value set in advance (Step S716). When the performance evaluation data does not satisfy the target value, the values of the "Magic Formula" parameters are amended (Step S718). The amended value is stored in the memory 4.

It should be noted that in the case of durability performance, for instance, the performance evaluation data is the maximum value of a stress placed on a specific member or a deformation amount of the specific member. In the case of emergency avoidance performance, the performance evaluation data is data of a relation between a traveling speed including vehicle braking/driving and the maximum lateral acceleration.

A method of amending the values of the "Magic Formula" parameters is not specifically limited. The parameter values are successively changed by a predetermined quantity, for instance.

Next, the dynamic element parameters for the tire dynamic model are derived using the amended parameter values (Step S720). More specifically, the "Magic Formula" data/parameter calculation program 11 calculates the characteristic curves of the longitudinal force, the lateral force, and the torque and stores those characteristic curves in the memory 4. The values of the "Magic Formula" parameters are set for each of multiple load conditions and multiple conditions for the slip ratio in the braking/driving direction, for instance. Therefore, the characteristic curves expressing the slip angle dependency are created for each condition. Next, the small slip angle condition parameter calculation program 20 extracts the dynamic element parameters for the tire dynamic model, and further the $F_x/F_y/M_z$ parameter calculation program 22 derives the remaining dynamic element parameters for the tire dynamic model (Step S720). The derived values of the dynamic element parameters are stored in the memory 4 as the values of the dynamic element parameters corresponding to the amended "Magic Formula" parameters.

After the derivation of the values of the dynamic element parameters, the judgment as to whether the target is achieved is made again through Steps S706, S712, S714, and S716.

Then, until the performance evaluation data achieves the target value, the dynamic element parameters are repeatedly amended.

When a result of the judgment in Step S716 is affirmative, the values of the dynamic element parameters stored in the memory 4 are determined as a tire requisite specification (Step S722).

A combination of an actual tire part material and tire structure that realizes the values of the dynamic element parameters determined as the tire design specification is set. For instance, when the determined lateral bending coefficient ε of the belt part is realized with an actual tire, a belt width, a belt cord angle, a cord material, a cord diameter, a cord density, and the like are determined so that a value of lateral bending stiffness $EI_z$ (stiffness against lateral bending of the belt) determined from this lateral bending coefficient ε is realized. When doing so, there are many design elements such as the belt width, the belt cord angle, the cord material, the cord diameter, and the cord density, which determine the value of the lateral bending stiffness $EI_z$, so the design elements such as the belt width, the belt cord angle, the cord material, the cord diameter, and the cord density are determined with consideration given to tire durability and ride comfort other than the tire dynamic characteristic. Such tire design elements include not only elements for the tire structure but also elements for the tire part material and an optimal combination of those design elements that realizes the values of the tire dynamic element parameters is determined while maintaining the tire durability and the ride comfort.

As described above, the tire design specification is expressed by the dynamic element parameters that constitute the tire dynamic model reproduced according to tire structure dynamics and are easy for a tire designer to understand, so it becomes possible for anyone to know how to make an amendment with ease so long as he/she is a tire designer, which facilitates the amendment. Also, it becomes possible to determine the values of the dynamic parameters for the tire dynamic model as the tire design specification and associate the determined values with the values of the "Magic Formula" parameters that vehicle designers are accustomed to using, which enables smooth development collaboration with a tire designer and dramatically improves development efficiency.

Also, the dynamic element parameters are realizable with the tire dynamic model, so it is possible to say that the dynamic element parameters are a tire design specification that is realizable in tire structure designing and material designing. Consequently, it becomes possible to determine a realizable tire design specification based on the data of the vehicle specification.

EXAMPLES

In the manner described above, the apparatus 1 uses characteristic curves shown in FIGS. 15 and 16 and links the values of the "Magic Formula" parameters and the values of the tire dynamic element parameters to each other.

FIG. 15 shows the characteristic curves of the longitudinal force $F_x$, the lateral force $F_y$, and the torque $M_z$ at a time when the slip angle α is changed by fixing the applied load and the slip ratio S in the braking/driving direction to constant values. FIG. 16 shows the characteristic curves of the longitudinal force $F_x$, the lateral force $F_y$, and the torque $M_z$ at a time when the slip ratio S in the braking/driving direction is changed by fixing the applied load and the slip angle α to constant values. In those drawings, corresponding to the definition of the "Magic Formula", "the slip ratio and the longitudinal force on a braking side are set to negative" and "an initial torque $M_z$ at a time when a positive slip angle α is applied at the slip ratio S of zero is set to negative".

It should be noted that the values of the dynamic element parameters of a tire A and a tire B of FIGS. 15 and 16 are shown in Table 1 given below. The tire traveling speed is 60 km/h and the applied load is 4 kN.

TABLE 1

|  | TIRE A | TIRE B |
| --- | --- | --- |
| n | 4 | 4 |
| $C_q$ (kN$^{-1}$) | 0.04 | 0.04 |
| $C_{xc}$ (kN$^{-1}$) | 0.04 | 0.04 |

TABLE 1-continued

|  | TIRE A | TIRE B |
|---|---|---|
| 1 (m) | 0.117 | 0.117 |
| $K_x = K_y$ (kN) | 119 | 113 |
| $A_y$ (kN) | 2.32 | 2.21 |
| $\epsilon$ (kN$^{-1} \cdot$ m$^{-1}$) | 0.06 | 0.06 |
| $G_{mz}$ (kN $\cdot$ mrad$^{-1}$) | 12 | 12 |
| $\mu_s$ | 1.8 | 1.94 |
| $\mu_d$ | 1.1 | 1.19 |
| $b_y$ | 0.008 | 0.008 |

Table 2 given below shows examples of values of the "Magic Formula" parameters evaluated from the characteristic curves shown in FIGS. 15 and 16. The values of the "Magic Formula" parameter reflect the values of the tire dynamic element parameters and differ between the tires A and B.

TABLE 2

|  | TIRE A | TIRE B |
|---|---|---|
| VALUES OF PARAMETERS EVALUATED FROM CHARACTERISTIC CURVE OF LONGITUDINAL FORCE $F_x$ | B = 2.052<br>C = 1.117<br>D = 13.169 | B = 2.060<br>C = 1.203<br>D = 11.612 |
| VALUES OF PARAMETERS EVALUATED FROM CHARACTERISTIC CURVE OF LATERAL FORCE $F_y$ | B = 1.579<br>C = −1.096<br>D = −14.657 | B = 1.608<br>C = −1.183<br>D = −13.251 |

Figure 17A:
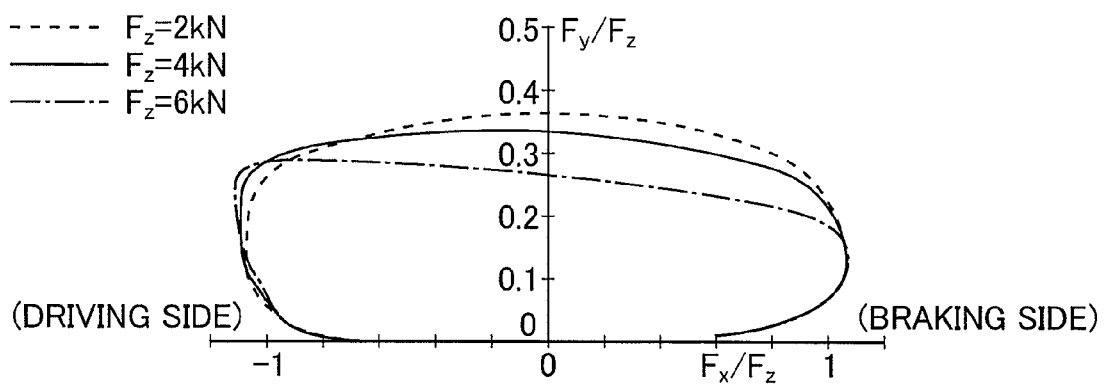
FIGS. 17A and 17B each shows examples of results of tire friction ellipses obtained in the methods according to the present invention.
Figure 17B:
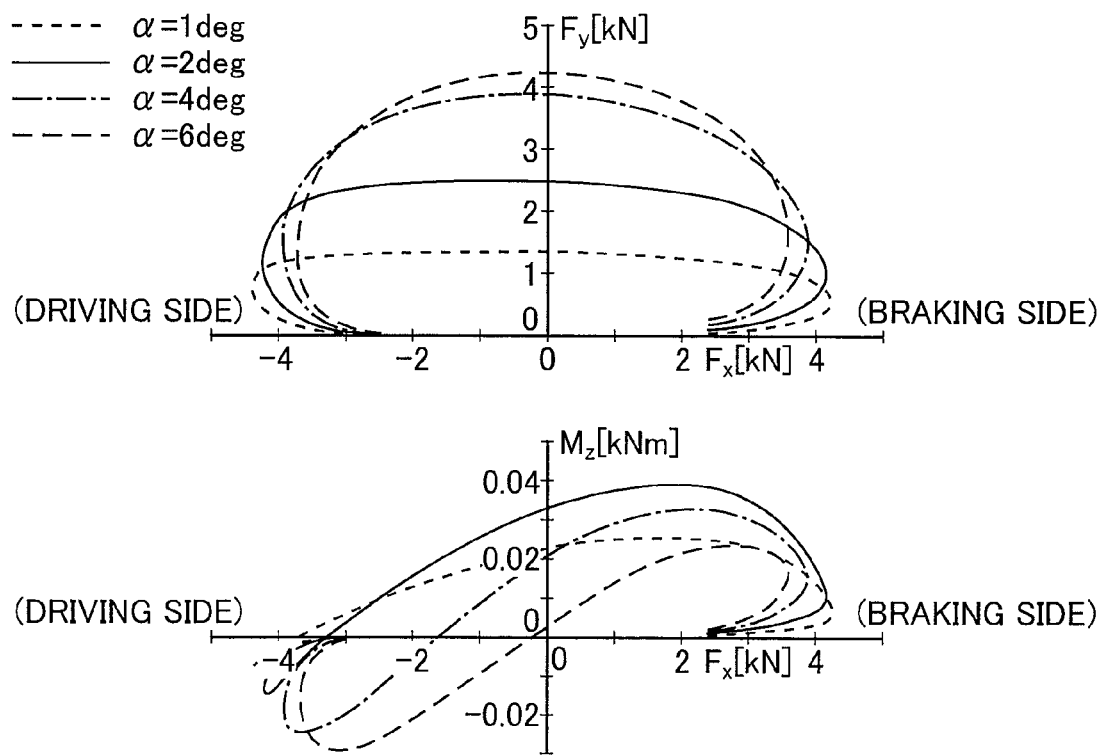

FIG. 17A shows a graph of load dependency of the lateral force $F_y$, the longitudinal force $F_x$, and the torque $M_z$ calculated in the apparatus 1 and FIG. 17B shows a graph of slip angle dependency of the lateral force $F_y$, the longitudinal force $F_x$, and the torque $M_z$ calculated in the apparatus 1.

The values of the tire dynamic element parameters are set as follows.

n=4

$C_q$=0.04 (1/kN)

$C_{xc}$=0.04 (1/kN)

l=0.117 (m) (applied load $F_z$=4 kN)

$K_x=K_y$=109.7 (kN)

$A_y$=2.08 (kN·m)

$\epsilon$=0.06 (1/(kN·m))

$G_{mz}$=12.0 (kN·m/rad)

$\mu_s$=1.8

$\mu_d$=1.1

$b_y$=0.008

FIG. 17A shows a tire friction ellipse in which the calculated values of the longitudinal force $F_x$, the lateral force $F_y$, and the torque $M_z$ are plotted for each applied load (2 kN, 4 kN, and 6 kN) while the slip ratio S in the braking/driving direction is changed from a driving region to a braking region with the slip angle α fixed to one degree. In a graph on an upper level of FIG. 17A, $F_x/F_z$ obtained by normalizing the longitudinal force $F_x$ by the applied load $F_z$ is set on a horizontal axis and $F_y/F_z$ obtained by normalizing the lateral force $F_y$ by the applied load $F_z$ is set on a vertical axis. In a graph on a lower level of FIG. 17A, $F_x/F_z$ obtained by normalizing the longitudinal force $F_x$ by the applied load $F_z$ is set on a horizontal axis and $M_z/F_z$ obtained by normalizing the torque $M_z$ by the applied load $F_z$ is set on a vertical axis.

On the other hand, FIG. 17B shows a tire friction ellipse in which the calculated values of the longitudinal force $F_x$, the lateral force $F_y$, and the torque $M_z$ are plotted for each slip angle α (one degree, two degrees, four degrees, and six degrees) while the slip ratio S in the braking/driving direction is changed from a driving region to a braking region with the applied load $F_z$ fixed to 4 (kN). In graphs on upper and lower levels of FIG. 17B, the same vertical and horizontal axes as in the graphs on the upper and lower levels of FIG. 17A are set.

Figure 18:
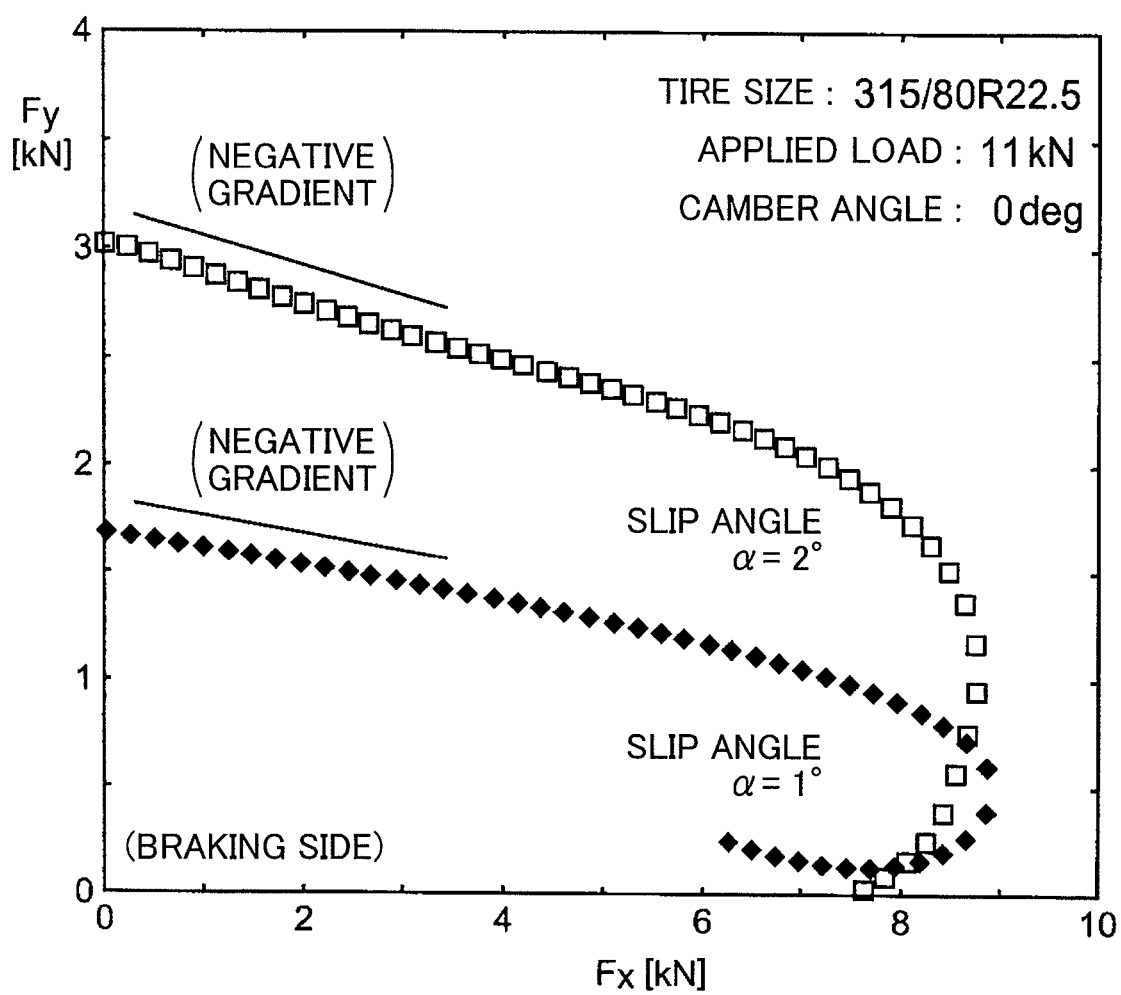
FIG. 18 shows examples of results of tire friction ellipses obtained through actual measurement.
Figure 19A:
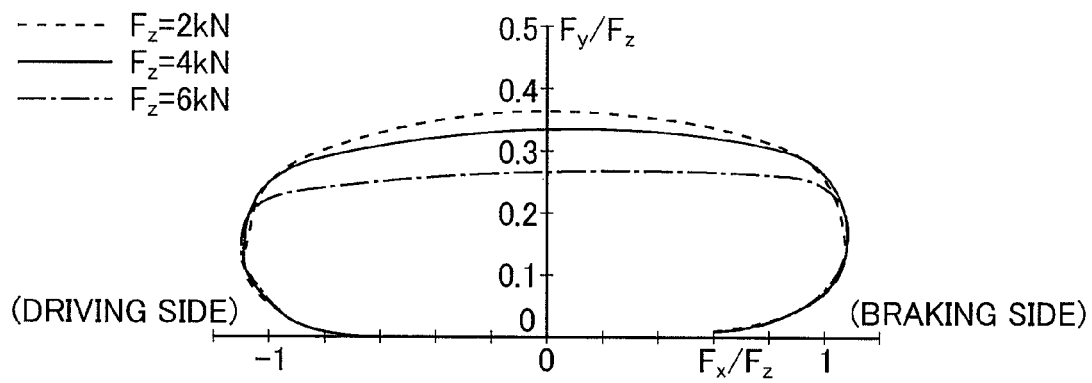
FIGS. 19A and 19B each shows examples of results of tire friction ellipses obtained in the methods according to the present invention.
Figure 19B:
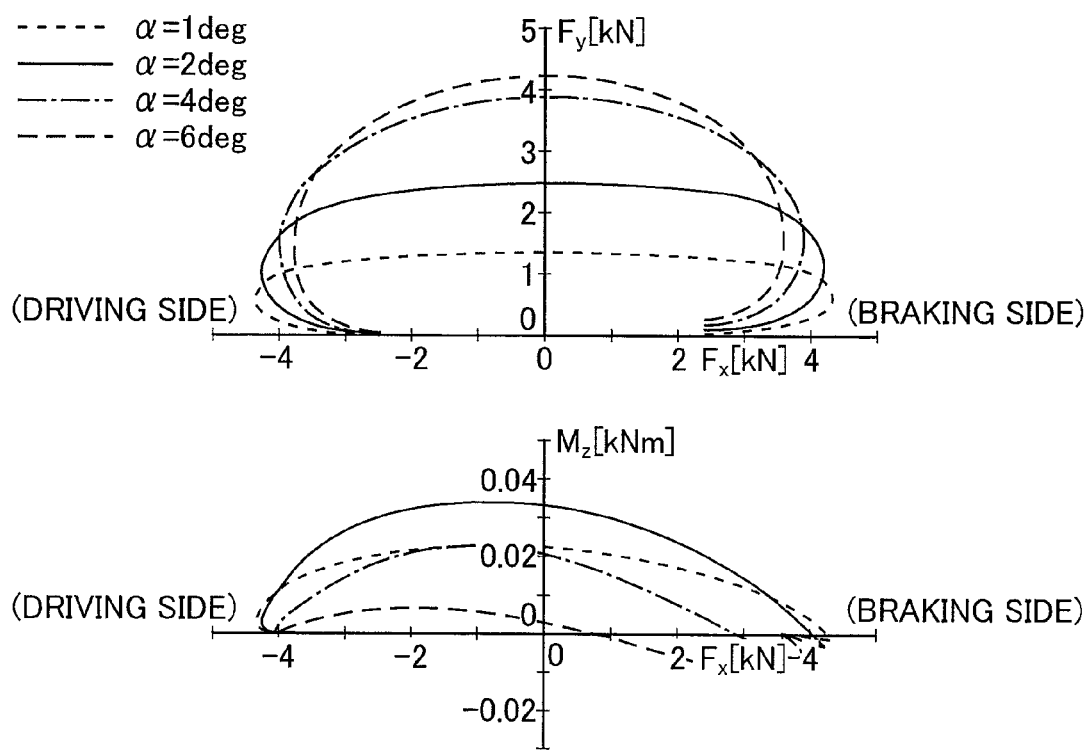

FIG. 18 shows a part of friction ellipses obtained by plotting results of actual measurement of a tire of 315/80R22.5 at a high applied load of 11 kN with a camber angle of zero degree by setting the longitudinal force $F_x$ on a horizontal axis and the lateral force $F_y$ on a vertical axis. As shown in the drawing, those friction ellipses have gradients that are negatively inclined in a rightward direction. Such a gradient shows, as is represented by a friction ellipse on an upper level of FIG. 21B to be described later, the negative gradient which is changed with occurrence of the longitudinal force is caused by adjustment of the value of the movement coefficient $C_{xc}$ of the contact patch ($C_{xc}$=0%→50%→100%). Note that in examples shown in FIG. 21B, the tire size and the applied load are different. Also in FIG. 17A, a negative gradient is observed at a high applied load $F_z$ of 6 kN, but in FIGS. 19A and 19B showing friction ellipses which corresponds to the friction ellipses in FIGS. 17A and 17B at a time when the movement coefficient $C_{xc}$ (=0.04) that is a dynamic element parameter is set to almost zero, no negative gradient is observed.

As a result, it becomes possible to express a negative gradient, which occurs in the case of an actual tire, by adjusting the center position of the contact patch of the tire, which has not conventionally been incorporated, using the value of the movement coefficient $C_{xc}$ that changes in accordance with the longitudinal force $F_x$.

Figure 20A:
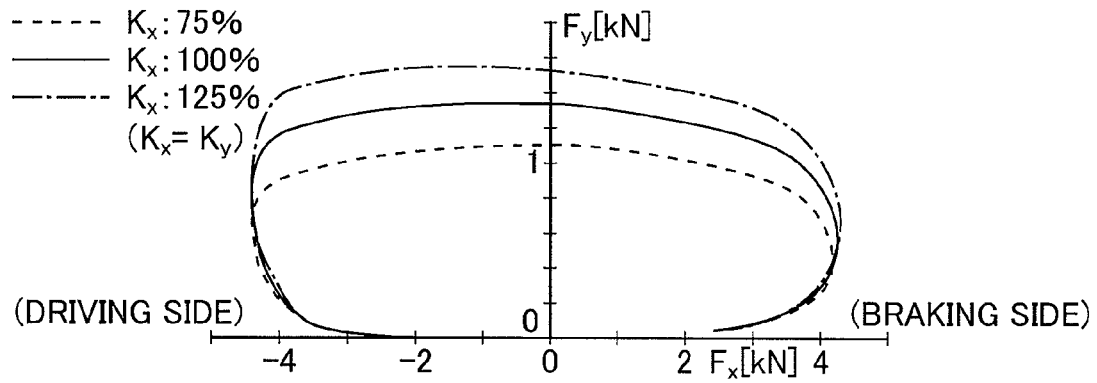
FIGS. 20A and 20B each shows examples of results of tire friction ellipses obtained in the methods according to the present invention.
Figure 20B:
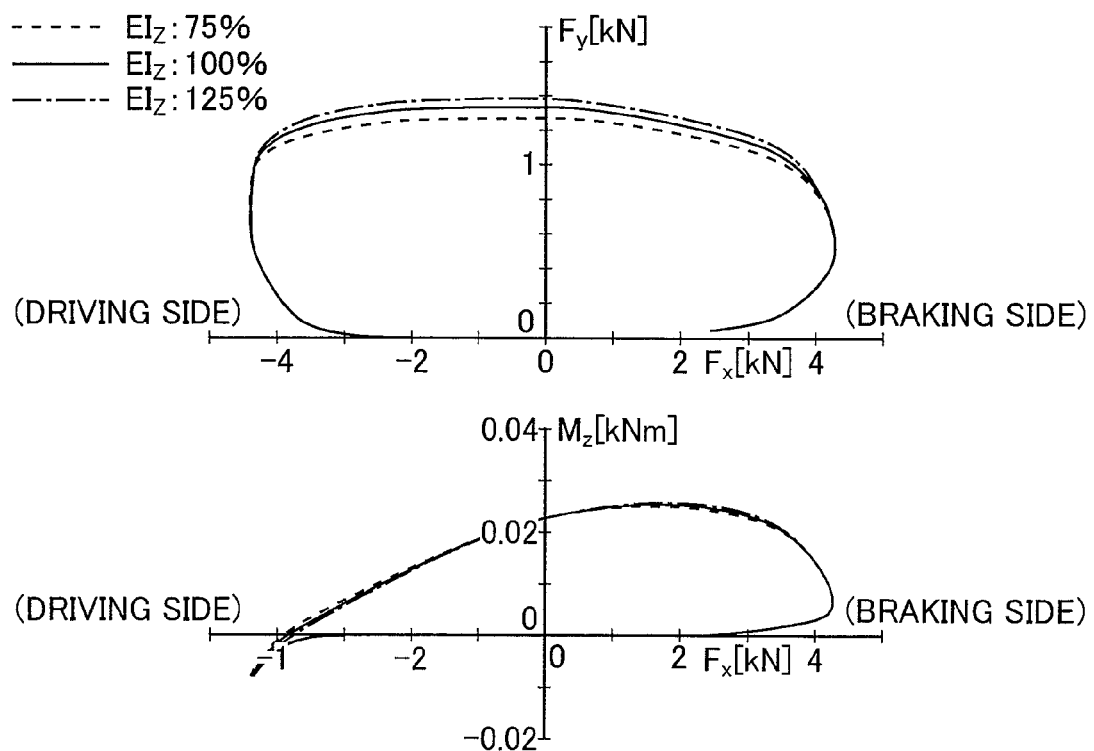

FIGS. 20A, 20B, 21A, and 21B show examples of changes of tire friction ellipses at a time when the values of the tire dynamic element parameters are changed. FIG. 20A shows tire friction ellipses at a time when $K_x=K_y$ is changed to each of 75% and 125% of a current set value (100%). FIG. 20B shows tire friction ellipses at a time when the belt lateral bending stiffness $EI_z$ is changed to each of 75% and 125% of a current set value (100%). FIG. 21A shows tire friction ellipses at a time when the tire sidewall stiffness $k_y$ is changed to each of 75% and 125% of a current set value (100%).

It should be noted that the lateral bending stiffness $EI_z$ in FIG. 20B has the following relation with the nonlinear parameter $\epsilon$.

$$\epsilon \propto (EI_z)^{(-3/2)}$$

Also, the sidewall stiffness $k_y$ in FIG. 21A has the following relations with the nonlinear parameters $\epsilon$ and $G_{mz}$.

$$\epsilon \propto ky(-\frac{1}{4})$$

$$Gmz \propto k_y$$

FIG. 21B shows tire friction ellipses at a time when the center position of the contact patch of the tire is changed to 50% and 0% of a current set value (100%) at which the movement coefficient $C_{xc}$ that changes in accordance with the longitudinal force $F_x$ is set to a predetermined value. It can be seen from this drawing that as the movement coefficient $C_{xc}$ increases, values on a driving side of the friction ellipses of the axi-symmetric shape increase and values on a braking side decrease. Therefore, the friction ellipses exhibit negative gradients.

As described above, it can be understood that the friction ellipses change as the values of the tire dynamic element parameters are changed. It is possible to reflect information of such tire friction ellipses on the values of the "Magic Formula" parameters through the characteristic curves, which makes it possible to effectively use the tire friction ellipse information in vehicle development.

From the above description, the approximate expression parameters for the nonlinear approximation that is expressible as the tire dynamic characteristic under the braking/driving condition are linked with the tire dynamic element parameters including various kinds of tire stiffness through the characteristic curves, and it is possible to determine the values of the parameters as parameters that are realizable with an actual tire. Also, each time the values of the approximate expression parameters are amended, the values of the tire dynamic element parameters are derived, so when the vehicle model satisfies predetermined performance, the values of the tire dynamic element parameters that are easy for a tire manufacturer to understand are also determined. Therefore, it becomes possible for a car manufacturer to present those values of the tire dynamic element parameters as the tire requisite characteristic with efficiency. Also, the approximate expression parameters for the nonlinear approximation that are expressed as the tire dynamic characteristic are linked with the tire dynamic element parameters including various kinds of tire stiffness, which makes it possible even for unskilled designers to efficiently determine a tire design specification using parameters that are realizable with an actual tire.

The tire dynamic element parameters are parameters that are easy for a tire manufacturer to understand and conventionally it has been relatively well known which tire size and shape should be used to adjust the tire dynamic element parameters, so it becomes possible for the tire manufacturer to perform tire designing with ease based on a determined tire design specification.

In addition, the tire characteristic exerts a significant influence on vehicle performance. Therefore, the tire characteristic amendment step, in which the tire characteristic is amended, is performed after the vehicle specification amendment step, in which the information of the vehicle specification is amended and a traveling simulation and a vehicle performance evaluation are performed, is performed at least once. So, it becomes possible to efficiently achieve a part of target performance, which is unachievable with the vehicle specification, with the tire characteristic, to thereby make it possible to efficiently perform vehicle designing including tire designing.

The present invention has been described in detail above, but is not limited to the embodiment described above and it is definitely possible to make various modifications and changes without departing from the gist of the present invention.

What is claimed is:

1. A tire characteristic calculation method of calculating at least one of a value of a tire axial force and a value of a self-aligning torque, each of the tire axial force and the self-aligning torque acting on a tire rotation axis at a time when a slip ratio is given to a tire, comprising the steps of:
setting values of a plurality of tire dynamic element parameters for a tire dynamic model constructed by using the tire dynamic element parameters; and
calculating at least one of the value of the tire axial force and the value of the self-aligning torque using the tire dynamic model to which the set values of the tire dynamic element parameters are given, and outputting the calculated value,
wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

2. A tire dynamic element parameter value derivation method of deriving, from a characteristic curve expressing slip ratio dependency of at least one of a tire axial force and a self-aligning torque that act on a tire rotation axis at a time when a slip ratio is given to a tire, values of a plurality of tire dynamic element parameters for a tire dynamic model constructed by using the tire dynamic element parameters, the tire dynamic element parameters determining the characteristic curve, the method comprising the steps of:
acquiring the characteristic curve;
setting initial values of the tire dynamic element parameters for the tire dynamic model;
calculating a curve corresponding to the characteristic curve using the initial values and the tire dynamic model;
repeating, until the calculated curve matches with the characteristic curve within an allowance range, an amendment of the set values of the tire dynamic element parameters and a calculation of the curve corresponding to the characteristic curve each time the set values of the tire dynamic element parameters are amended; and
determining the values of the tire dynamic element parameters at a time when the calculated curve matches with the characteristic curve within the allowance range as final values of the tire dynamic element parameters corresponding to the characteristic curve,
wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

3. A vehicle traveling simulation method of performing a traveling simulation of a vehicle fitted with a tire using a characteristic curve expressing slip ratio dependency of at least one of a tire axial force and a self-aligning torque that act on a tire rotation axis at a time when a slip ratio is given to the tire, comprising the steps of:
setting values of a plurality of tire dynamic element parameters for a tire dynamic model constructed by using the tire dynamic element parameters;
calculating the characteristic curve expressing the slip ratio dependency using the tire dynamic model to which the set values of the tire dynamic element parameters are given, and outputting the calculated characteristic curve; and
providing, to a vehicle model, values of approximate expression parameters that stipulate a nonlinear approximation and are obtained at a time when the calculated characteristic curve is approximated with the nonlinear approximation performing the traveling simulation under a predetermined traveling condition by using the vehicle model, and outputting a result of the simulation, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

4. A vehicle designing method, with a concept of a tire friction ellipse employed, of designing a vehicle having desired vehicle performance by performing a vehicle traveling simulation using information of a vehicle specification and information of a characteristic curve expressing slip ratio dependency of at least one of a tire axial force and a self-aligning torque that act on a tire rotation axis at a time when a slip ratio is given to a tire, comprising:

a model creating step of creating a vehicle model by using the information of the vehicle specification;

a performance evaluating step of:
providing values of approximate expression parameters for stipulating a nonlinear approximation to the vehicle model, the values of the approximate expression parameters being obtained by approximating the characteristic curve with a nonlinear approximation,
performing the traveling simulation under a traveling condition in which the slip ratio is given, and
evaluating a vehicle performance by using a result of the traveling simulation;

a vehicle specification amending step of:
amending the information of the vehicle specification when the vehicle model fails to satisfy target performance in the performance evaluating step,
creating the vehicle model by using the amended information of the vehicle specification,
performing the traveling simulation, and
evaluating the vehicle performance;

a tire characteristic amending step of:
amending the values of the approximate expression parameters when the vehicle model fails to satisfy predetermined target performance in the performance evaluating step,
performing the traveling simulation by giving the amended values of the approximate expression parameters to the vehicle model,
performing the vehicle performance evaluation by using a result of the traveling simulation,
calculating the characteristic curve expressing the slip ratio dependency from a nonlinear approximation stipulated by the amended values of the approximate expression parameters, and
deriving values of a plurality of tire dynamic element parameters through the calculated characteristic curve based on a tire dynamic model constructed by the tire dynamic element parameters; and a tire characteristic determining step of:
determining, when the vehicle model satisfies the target performance, the values of the tire dynamic element parameters derived in correspondence with the amended values of the approximate expression parameters as a tire requisite characteristic, and
outputting the determined tire requisite characteristic, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force, and the tire characteristic amending step is performed after the vehicle specification amending step is performed at least once.

5. The vehicle designing method according to claim 4, wherein the tire dynamic model calculates a lateral force, at a time when a slip angle is given to the tire dynamic model as a part of the slip ratio, and calculates the self-aligning torque by separately calculating a lateral force based torque component generated by the lateral force that acts on the contact patch of the tire dynamic model and a longitudinal force based torque component generated by the longitudinal force that acts on the contact patch of the tire dynamic model.

6. The vehicle designing method according to claim 4, wherein:
the tire axial force at least includes a lateral force that acts in a direction parallel to the tire rotation axis when a slip angle is given to the tire dynamic model as a part of the slip ratio; and
the calculating of the characteristic curve in the tire characteristic amending step includes calculating a characteristic curve of the lateral force, and also a characteristic curve expressing slip ratio dependency of a self-aligning torque which is generated by the lateral force and the longitudinal force that act between the tire dynamic model and the road surface.

7. The vehicle designing method according to claim 6, wherein the values of the tire dynamic element parameters are derived in the tire characteristic amending step so that a value of a combined sum of squared residuals obtained through weighted addition of a first sum of squared residuals, a second sum of squared residuals, and a third sum of squared residuals by using weighting coefficients becomes equal to or smaller than a predetermined value,
the first sum of squared residuals representing a sum of squared residuals between a characteristic curve of the longitudinal force and a corresponding curve of the longitudinal force calculated in the tire dynamic model,
the second sum of squared residuals representing a sum of squared residuals between a characteristic curve of a lateral force and a corresponding curve of the lateral force calculated in the tire dynamic model,
the third sum of squared residuals representing a sum of squared residuals between a characteristic curve of the self-aligning torque and a corresponding curve of the self-aligning torque calculated in the tire dynamic model,
wherein the weighting coefficients are obtained from information of variations of values of the respective characteristic curves of the longitudinal force, the lateral force and the self-aligning torque that change in dependence on the slip ratio.

8. The vehicle designing method according to claim 4, wherein the values of the tire dynamic element parameters are derived in the tire characteristic amending step by using an effective slip angle, the effective slip angle being obtained by modifying a given slip angle through a torsional deformation of the tire dynamic model caused by the self-aligning torque.

9. The vehicle designing method according to claim 4, wherein the values of the tire dynamic element parameters derived in the tire characteristic amending step include an adhesive friction coefficient and a sliding friction coefficient between a tread member of the tire dynamic model and the road surface, and a shape stipulation coefficient that stipulates a shape of a contact pressure distribution.

10. The vehicle designing method according to claim 4, wherein the tire dynamic model calculates, when a slip angle and the slip ratio in the braking/driving direction are given as the slip ratio, the longitudinal force, a lateral force, and the self-aligning torque by using a sliding direction of the tire dynamic model in a sliding region in the contact patch, the sliding direction being determined by the given slip angle and slip ratio in the braking/driving direction.

11. A tire designing method, with a concept of a tire friction ellipse employed, of designing a tire achieving desired performance by performing a vehicle traveling simulation using information of a characteristic curve expressing slip ratio dependency of at least one of a tire axial force and a self-aligning torque that act on a tire rotation axis at a time when a slip ratio is given to the tire and information of a vehicle specification, comprising:

a model creating step of creating a vehicle model by using the information of the vehicle specification;

a performance evaluating step of:

setting values of a plurality of tire dynamic element parameters determining the characteristic curve for a tire dynamic model constructed using the plurality of tire dynamic element parameters, providing values of approximate expression parameters for stipulating a nonlinear approximation to the vehicle, the values of approximate expression parameters being obtained by approximating a characteristic curve with the nonlinear approximation, the characteristic curve being calculated using the values of the tire dynamic element parameters for the tire dynamic model, performing the traveling simulation under a predetermined traveling condition by using the vehicle model, and evaluating a vehicle performance by using a result of the traveling simulation;

a tire characteristic amending step of:

amending the values of the approximate expression parameters when the vehicle model fails to satisfy target performance in the performance evaluating step, performing the traveling simulation by giving the amended value to the vehicle model, performing the vehicle performance evaluation by using a result of the traveling simulation, and deriving the values of the tire dynamic element parameters based on the tire dynamic model by using a characteristic curve which is calculated from the nonlinear approximation stipulated by the amended value of the approximate expression parameters; and a tire characteristic determining step of:

determining, when the vehicle model satisfies predetermined performance, the derived values of the tire dynamic element parameters as a tire target characteristic, and outputting the determined target characteristic, wherein the tire dynamic model allows a center position of a contact patch thereof against a road surface to move in accordance with a longitudinal force that occurs as the tire axial force when a slip ratio in a braking/driving direction is given so that a position of the contact patch moves in a longitudinal direction due to the longitudinal force.

12. The tire designing method according to claim 11, wherein the tire dynamic model calculates, at a time when a slip angle is given to the tire dynamic model, lateral force, and calculates, at the time when the slip angle is given, the self-aligning torque by separately calculating a lateral force based torque component generated by the lateral force that acts on the contact patch of the tire dynamic model and a longitudinal force based torque component generated by the longitudinal force that acts on the contact patch of the tire dynamic model.

13. The tire designing method according to claim 11, wherein:

the tire axial force at least includes a lateral force that acts in a direction parallel to the tire rotation axis when a slip angle is given to the tire dynamic model; and the calculating of the characteristic curve by using the tire dynamic model includes calculating a characteristic curve of the lateral force, and also a characteristic curve expressing slip ratio dependency of a self-aligning torque generated by the lateral force and the longitudinal force that act between the tire dynamic model and the road surface.

14. The tire designing method according to claim 13, wherein the values of tire dynamic element parameters are derived in the tire characteristic amending step so that a value of a combined sum of squared residuals obtained through weighted addition of a fourth sum of squared residuals, a fifth sum of squared residuals, and a sixth sum of squared residuals by using weighting coefficients becomes equal to or smaller than a predetermined value, the fourth sum of squared residuals representing a sum of squared residuals between a characteristic curve of the longitudinal force and a corresponding curve of the longitudinal force calculated in the tire dynamic model, the fifth sum of squared residuals representing a sum of squared residuals between a characteristic curve of a lateral force and a corresponding curve of the lateral force calculated in the tire dynamic model, the sixth sum of squared residuals representing a sum of squared residuals between a characteristic curve of the self-aligning torque and a corresponding curve of the self-aligning torque calculated in the tire dynamic model, where the weighting coefficients are obtained from information of variations of values of the respective characteristic curves of the longitudinal force, the lateral force and the self-aligning torque that change in dependence on the slip ratio.

15. The tire designing method according to claim 11, wherein the values of the tire dynamic element parameters are derived in the tire characteristic amending step by using an effective slip angle, the effective slip angle being obtained by modifying a given slip angle through a torsional deformation of the tire dynamic model caused by the self-aligning torque.

16. The tire designing method according to claim 11, wherein the values of the tire dynamic element parameters derived in the tire characteristic amending step include an adhesive friction coefficient and a sliding friction coefficient between a tread member of the tire dynamic model and the road surface, and a shape stipulation coefficient that stipulates a shape of a contact pressure distribution.

17. The tire designing method according to claim 11, wherein the tire dynamic model is used for calculating, when a slip angle and the slip ratio in the braking/driving direction are given as the slip ratio, the longitudinal force, a lateral force, and the self-aligning torque by using a sliding direction of the tire dynamic model in a sliding region in the contact patch, the sliding direction being determined by the given slip angle and slip ratio in the braking/driving direction.

18. The tire designing method according to claim 11, further comprising designing a tire by using the values of the tire dynamic element parameters determined in the tire characteristic determining step, and determining a combination of a tire member material and a tire structure for achieving the values.

* * * * *